(12) United States Patent
Endo

(10) Patent No.: US 7,615,507 B2
(45) Date of Patent: Nov. 10, 2009

(54) OPTICAL GLASS, PRESS-MOLDING GLASS GOB AND OPTICAL ELEMENT

(75) Inventor: Michio Endo, Utsunomiya (JP)

(73) Assignee: Hoya Corporation, Tokyo (JP)

( * ) Notice: Subject to any disclaimer, the term of this patent is extended or adjusted under 35 U.S.C. 154(b) by 212 days.

(21) Appl. No.: 11/483,179

(22) Filed: Jul. 10, 2006

(65) Prior Publication Data
US 2007/0015651 A1 Jan. 18, 2007

(30) Foreign Application Priority Data
Jul. 15, 2005 (JP) .............. 2005-206615

(51) Int. Cl.
C03C 3/15 (2006.01)
C03C 3/14 (2006.01)
C03C 3/155 (2006.01)
C03C 3/064 (2006.01)
C03C 3/068 (2006.01)

(52) U.S. Cl. .............. 501/50; 501/49; 501/51; 501/77; 501/78

(58) Field of Classification Search .............. 501/50, 501/51, 73, 78, 79, 41, 49; 65/305, 459
See application file for complete search history.

(56) References Cited

U.S. PATENT DOCUMENTS

| | | | | |
|---|---|---|---|---|
| 4,439,531 A | * | 3/1984 | Mennemann et al. | 501/75 |
| 4,526,874 A | * | 7/1985 | Grabowski geb. Marszalek et al. | 501/77 |
| 4,584,279 A | * | 4/1986 | Grabowski et al. | 501/78 |
| 5,288,669 A | * | 2/1994 | Grateau et al. | 501/78 |
| 5,588,980 A | * | 12/1996 | Ito | 65/223 |
| 6,121,176 A | * | 9/2000 | Comte | 501/78 |
| 6,912,093 B2 | | 6/2005 | Endo | |
| 7,490,485 B2 | | 2/2009 | Endo | |
| 2005/0209085 A1 | | 9/2005 | Endo | |

FOREIGN PATENT DOCUMENTS

| | | |
|---|---|---|
| JP | 50-18509 A | 2/1975 |
| JP | 60-033229 A | 2/1985 |
| JP | 9-278480 A | 10/1997 |
| JP | 2004-018286 | 1/2004 |
| JP | 2005-179142 A | 7/2005 |

\* cited by examiner

*Primary Examiner*—Karl E Group
*Assistant Examiner*—Noah S Wiese
(74) *Attorney, Agent, or Firm*—Nixon & Vanderhye P.C.

(57) ABSTRACT

An optical glass having a remarkably high refractive index and excellent stability can be give without being based on PbO, and the optical glass contains, as essential components, at least one oxide selected from $La_2O_3$, $Gd_2O_3$, $Y_2O_3$, $Yb_2O_3$, $TiO_2$, $Nb_2O_5$ or $WO_3$, at least one oxide selected from MgO, CaO, SrO or BaO and $B_2O_3$ and optionally containing $SiO_2$, wherein on the basis of mass, the total content of $B_2O_3$ and $SiO_2$ is from 1 to 25%, the ratio of $(B_2O_3+SiO_2)/(La_2O_3+Gd_2O_3+Y_2O_3+Yb_2O_3+TiO_2+Nb_2O_5+WO_3)$ is from 0.05 to 0.3 and the ratio of $(MgO+CaO+SrO+BaO)/(La_2O_3+Gd_2O_3+Y_2O_3+Yb_2O_3+TiO_2+Nb_2O_5+WO_3)$ is from 0.1 to 0.4, the optical glass having a refractive index (nd) of 2.000 or more and an Abbe's number (vd) of 27 or less.

13 Claims, 7 Drawing Sheets

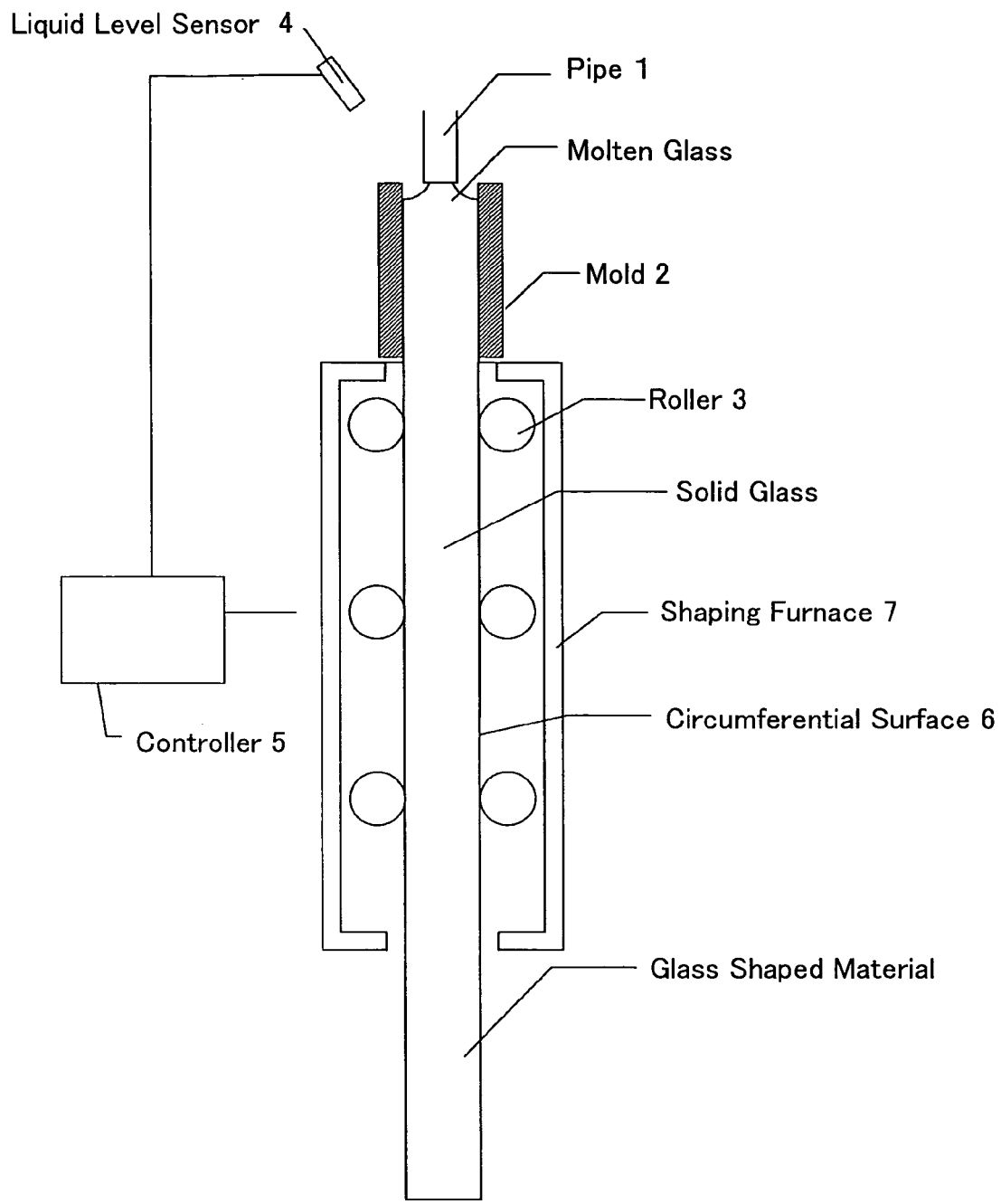
[Fig. 1]

[Fig. 2]
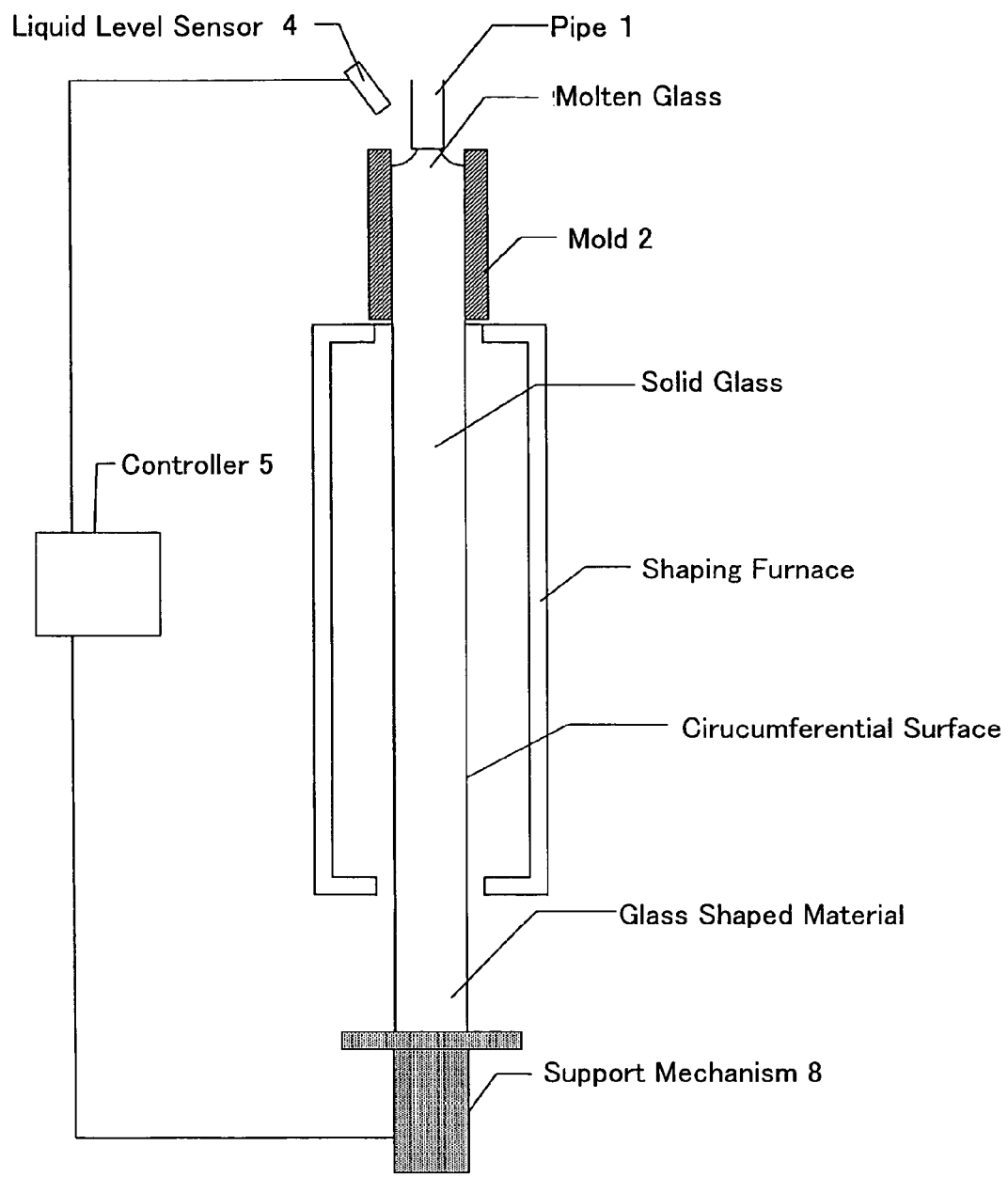

[Fig. 3]
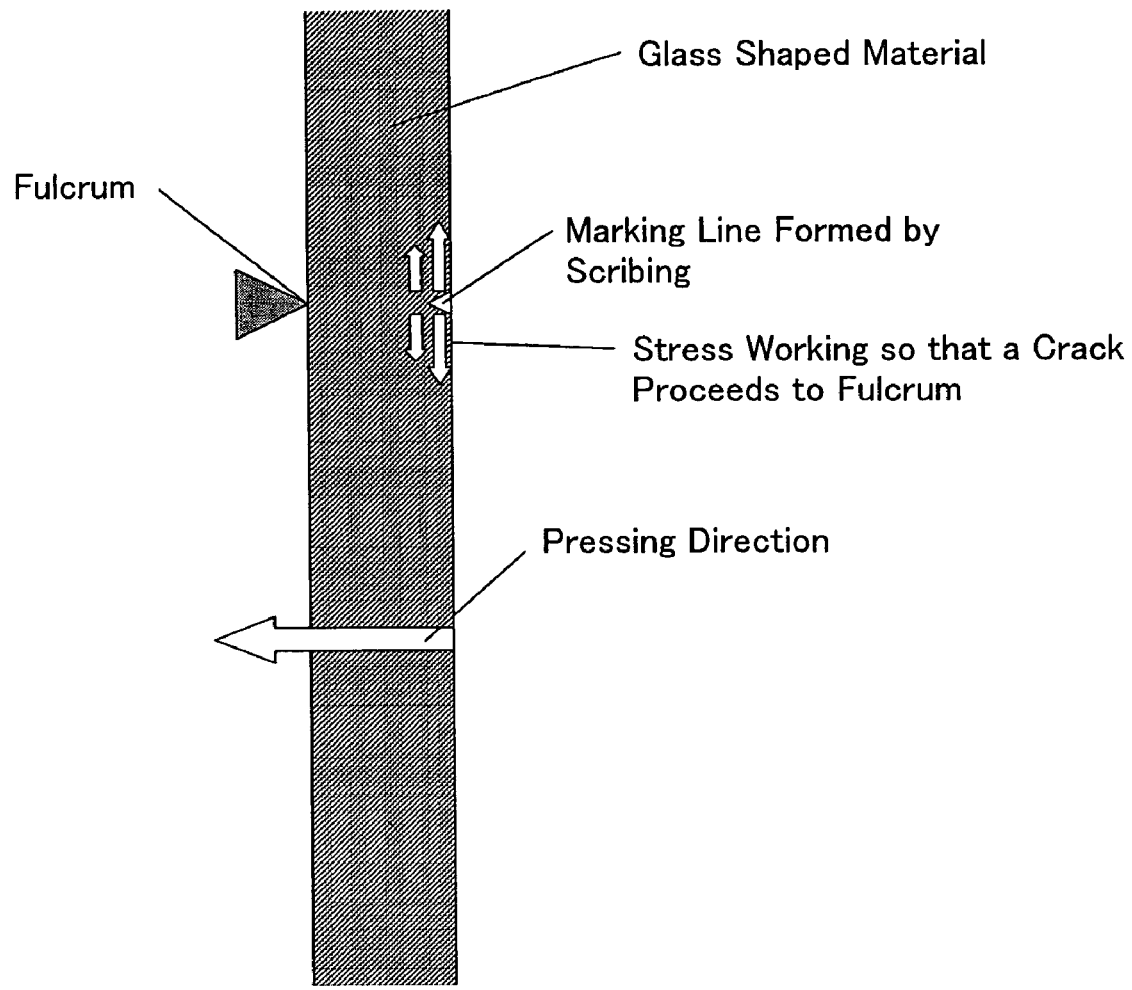

[Fig. 4]
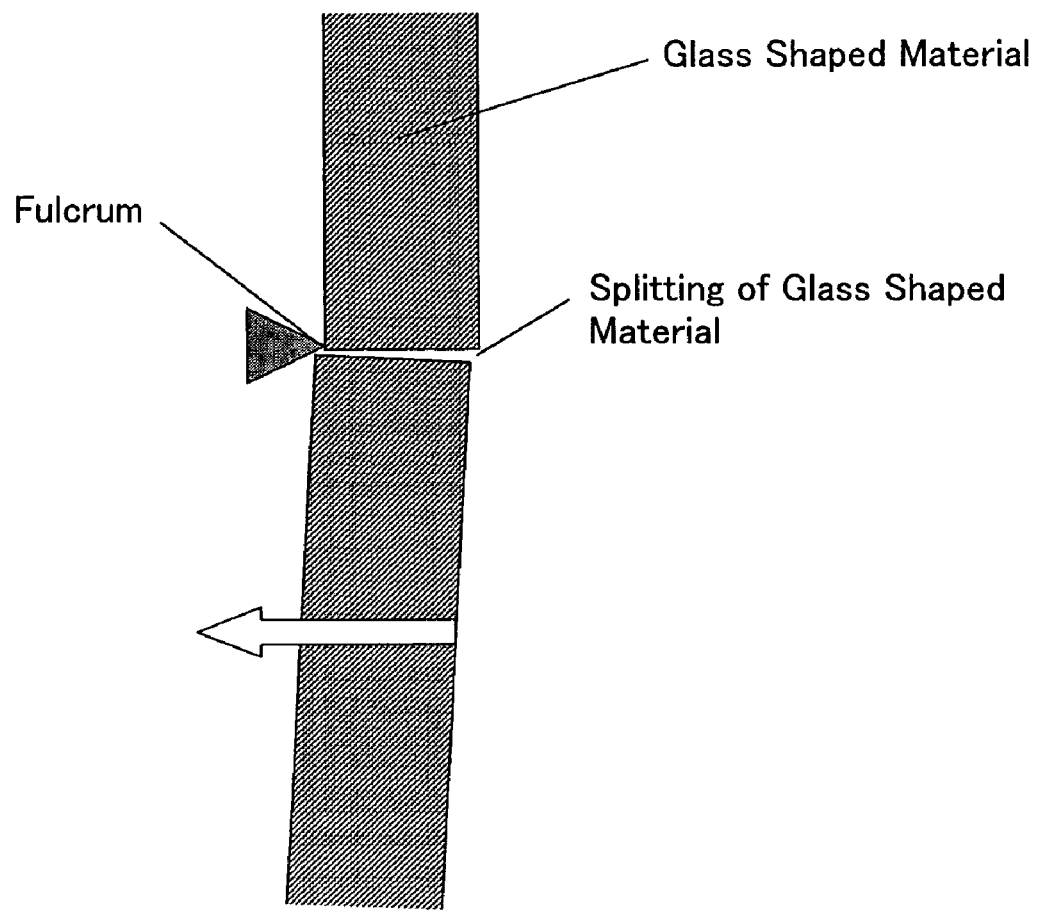

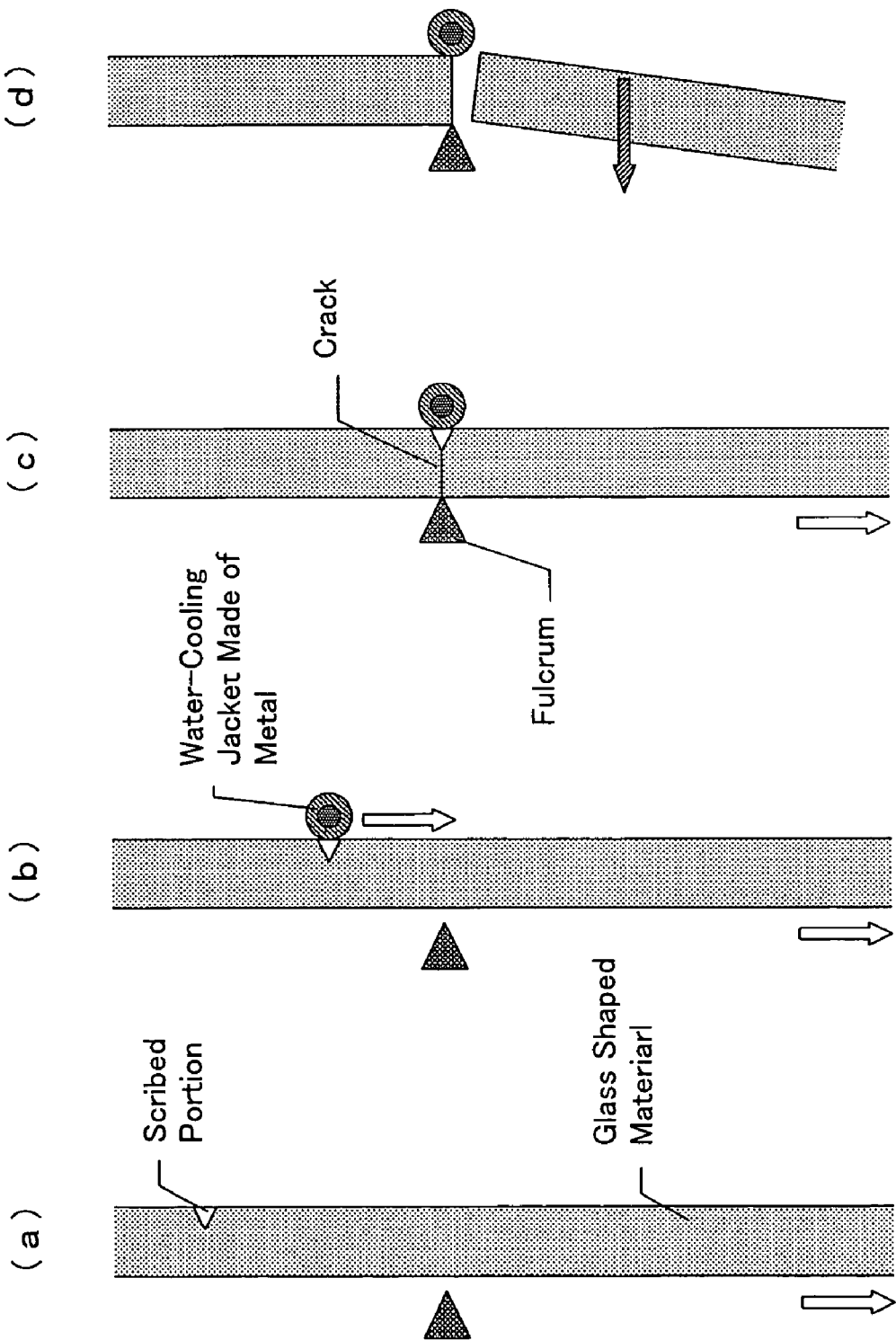
[Fig. 5]

[Fig. 6]
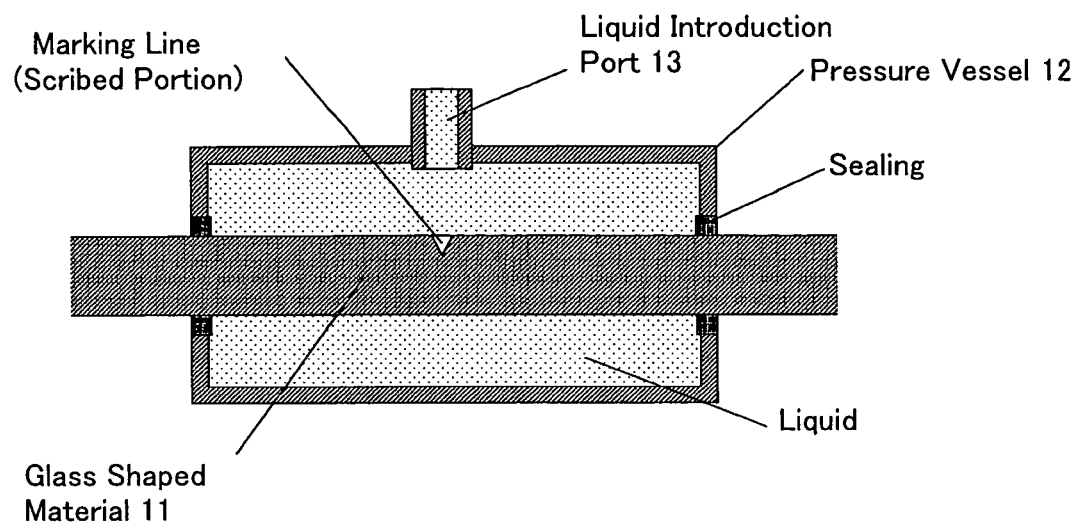

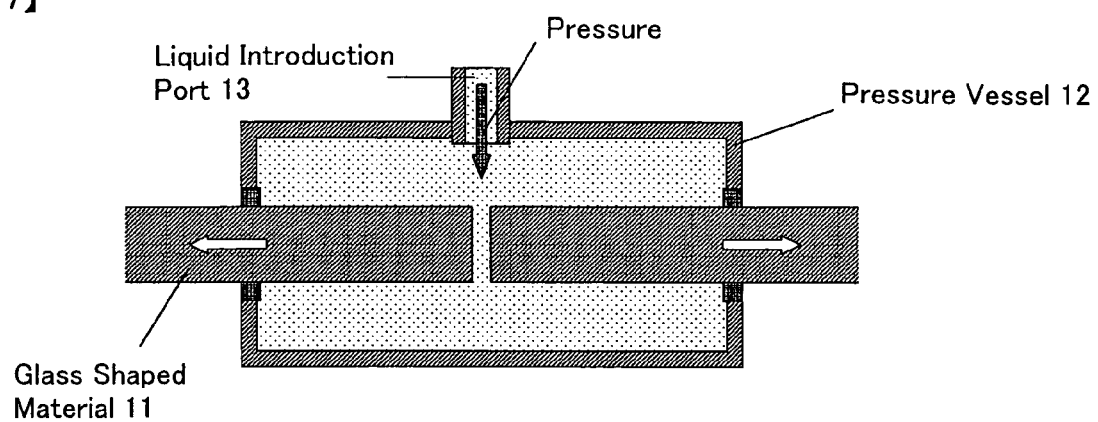
[Fig. 7]

OPTICAL GLASS, PRESS-MOLDING GLASS GOB AND OPTICAL ELEMENT

This application is a new U.S. patent application claiming priority to JP 2005-206615 filed 15 Jul. 2005, the entire content of which is hereby incorporated by reference in this application.

TECHNICAL FIELD

The present invention relates to an optical glass having a refractive index (nd) of 2,000 or more and an Abbe's number (vd) of 27 or less, and it also relates to a press-molding glass gob, an optical element and blank and an optical element which are formed of the above optical glass each and further relates to a process for the production of a glass shaped material formed of the above optical glass and a process for the production of a press-molding glass gob and an optical element by processing a glass shaped material obtained by the above production process.

BACKGROUND ART

In recent years, there are rapidly growing demands for small-size lenses with widespread use of digital cameras. As an optical element material for producing such small-size lenses, an ultrahigh-refractivity glass having a refractive index (nd) of 2 or more is suitable. As the above ultrahigh-refractivity glass, for example, a translucent ceramic material is known (for example, see JP-A-2004-18286).

However, while the above translucent ceramic has ultrahigh refractivity performances, it is fragile and has problems in processability and shapeability. Further, there is sometimes caused a problem that fine gas bubbles exist in grain boundaries and scatter light.

Therefore, if high refractivity can be realized with a glass, it is expected that the above problems of the ceramic can be overcome. For realizing ultrahigh refractivity performances with a glass, however, a large amount of PbO that has an adverse environmental effect is required, and it is difficult to provide a glass excellent in stability without using a large amount of PbO.

DISCLOSURE OF THE INVENTION

Problems to be Solved by the Invention

Under the circumstances, it is an object of the present invention to provide an optical glass that has a remarkably high refractive index and excellent stability without being based on PbO.

It is another object of the present invention to provide a press-molding glass gob, an optical element blank and an optical element each of which is formed of the above optical glass.

It is still another object of the present invention to provide a process for the production of a glass shaped material formed of the above optical glass and a process for the production of a glass gob and an optical element by processing a glass shaped material obtained by the above production process.

[Means to Solve the Problems]

For achieving the above objects, the present inventors have made diligent studies, and as a result it has been found that an optical glass having a specific composition has a high refractive index of 2.000 or more and has excellent stability without being based on PbO. It has been further found that glass shaped materials can be efficiently produced with stability by shaping the above optical glass by a specific process. The present invention has been accordingly completed on the basis of the above finding.

That is, the present invention provides (1) an optical glass comprising, as essential components, at least one oxide selected from $La_2O_3$, $Gd_2O_3$, $Y_2O_3$, $Yb_2O_3$, $TiO_2$, $Nb_2O_5$ and $WO_3$, at least one oxide selected from MgO, CaO, SrO and BaO, and $B_2O_3$ and optionally containing $SiO_2$, wherein on the basis of mass, (a) the total content of $B_2O_3$ and $SiO_2$ is from 1 to 25%, (b) the ratio of the total content of $B_2O_3$ and $SiO_2$ to the total content of $La_2O_3$, $Gd_2O_3$, $Y_2O_3$, $Yb_2O_3$, $TiO_2$, $Nb_2O_5$ and $WO_3$, $(B_2O_3+SiO_2)/(La_2O_3+Gd_2O_3+Y_2O_3+Yb_2O_3+TiO_2+Nb_2O_5+WO_3)$, is from 0.05 to 0.3, and (c) the ratio of the total content of MgO, CaO, SrO and BaO to the total content of $La_2O_3$, $Gd_2O_3$, $Y_2O_3$, $Yb_2O_3$, $TiO_2$, $Nb_2O_5$ and $WO_3$, $(MgO+CaO+SrO+BaO)/(La_2O_3+Gd_2O_3+Y_2O_3+Yb_2O_3+TiO_2+Nb_2O_5+WO_3)$, is from 0.1 to 0.4, the optical glass having a refractive index (nd) of 2.000 or more and an Abbe's number (vd) of 27 or less, (2) an optical glass as recited in the above (1), which contains, by mass %, 25 to 45% of total of $La_2O_3$, $Gd_2O_3$, $Y_2O_3$ and $Yb_2O_3$, 18 to 38% of $TiO_2$, 5 to 15% of $Nb_2O_5$, 0 to 7% of $WO_3$, 0 to 10% of total of MgO, CaO and SrO and 7 to 17% of BaO, (3) an optical glass as recited in the above (1) or (2), which contains 2 to 10 mass % of $ZrO_2$, (4) an optical glass as recited in any one of the above (1) to (3), which contains 1 to 15 mass % of $B_2O_3$ and 0 to 10 mass % of $SiO_2$, (5) an optical glass as recited in the above (4), wherein the ratio of content of $SiO_2$ to the content of $B_2O_3$, $SiO_2/B_2O_3$, on the basis of mass is from 0.3 to 2, (6) an optical glass as recited in any one of the above (1) to (5), which contains 25 to 40 mass % of $La_2O_3$, (7) an optical glass as recited in any one of the above (1) to (6), wherein the ratio of content of $Nb_2O_5$ to the content of $TiO_2$, $Nb_2O_5/TiO_2$, on the basis of mass is 0.1 or more but less than 0.5, (8) a press-molding glass gob formed of the optical glass of any one of the above (1) to (7), (9) an optical element blank that is an optical element blank formed of an optical glass for producing an optical element by grinding and polishing, the optical glass being an optical glass of any one of the above (1) to (7),

(10) an optical element formed of an optical glass of any one of the above (1) to (7),

(11) a process for the production of a glass shaped material formed of the optical glass of any one of the above (1) to (7), which comprises providing a mold having a through hole that has an inlet and an outlet, causing a molten glass flow to flow from the inlet into said through hole to fill said through hole with the molten glass flow and continuously withdrawing a glass material shaped in said through hole from the outlet of the through hole,

(12) a process for the production of a press-molding glass gob, which comprises processing a glass shaped material produced by the production process of the above (11), and

(13) a process for the production of an optical element, which comprises processing a glass shaped material produced by the process of the above (11).

EFFECT OF THE INVENTION

According to the present invention, there can be provided an optical glass having optical properties represented by a refractive index (nd) of 2.000 or more and an Abbe's number (vd) of 27 or less and having excellent stability as a glass. Further, a glass having the above properties can be realized without using PbO, so that a burden on the environment can be reduced.

According to the present invention, further, there can be also provided an optical element formed of an optical glass having a refractive index (nd) of 2.000 or more and an Abbe's number (vd) of 27 or less and a process for the production of a press-molding glass gob for producing the above optical element by a method including a press-molding step.

According to the present invention, further, there can be provided a process for the production of a glass shaped material in which a glass shaped material formed of the above optical glass can be stably produced from a molten glass. As a result, there can be also provided a process for the production of a press-molding glass gob in which press-molding glass gobs can be mass-produced from the above glass shaped material, and a process for the production of an optical element.

BRIEF DESCRIPTION OF DRAWINGS

FIG. 1 is a schematic drawing for explaining one embodiment of a production apparatus for use in the process for the production of a glass shaped material in the present invention.

FIG. 2 is a schematic drawing for explaining a variant of the production apparatus for use in the process for the production of a glass shaped material in the present invention.

FIG. 3 is a schematic drawing for explaining a method for splitting a glass shaped material in the process for the production of a glass shaped material in the present invention.

FIG. 4 is a schematic drawing for explaining the method for splitting a glass shaped material in the process for the production of a glass shaped material in the present invention.

FIG. 5 is a schematic drawing for explaining another method for splitting a glass shaped material in the process for the production of a glass shaped material in the present invention.

FIG. 6 is a schematic drawing for explaining a lateral pressure splitting method.

FIG. 7 is a schematic drawing for explaining the lateral pressure splitting method.

PREFERRED EMBODIMENTS OF THE INVENTION

In the optical glass of the present invention, $B_2O_3$ and $SiO_2$ work as components for a glass network, and $La_2O_3$, $Gd_2O_3$, $Y_2O_3$, $Yb_2O_3$, $TiO_2$, $Nb_2O_5$ and $WO_3$ work as high-refractivity-imparting components for increasing the refractive index. For increasing the refractive index, it is required to increase the content of the high-refractivity-imparting components. However, with an increase in the content of the high-refractivity-imparting components, the stability of the glass decreases and the tendency to devitrification increases. For increasing the content of the high-refractivity-imparting components while suppressing the tendency to devitrification, therefore, at least one component of MgO, CaO, SrO and BaO is introduced, and the ratio of the total content of the high-refractivity-imparting components and the total content of $B_2O_3$ and $SiO_2$ as network-forming components and the ratio of the total content of the high-refractivity-imparting components and the total content of MgO, CaO, SrO and BaO are brought into the specified ranges.

Of the high-refractivity-imparting components, for increasing the content of $La_2O_3$, $Gd_2O_3$, $Y_2O_3$ and $Yb_2O_3$ without increasing the tendency to devitrification, the ratio of the total content of the high-refractivity-imparting components and the total content of $B_2O_3$ and $SiO_2$ as network-forming components has an important meaning, and for increasing the content of $TiO_2$, $Nb_2O_5$ and $WO_3$ without increasing the tendency to devitrification, the ratio of the total content of the high-refractivity-imparting components and the total content of MgO, CaO, SrO and BaO has an important meaning.

The optical glass of the present invention has been completed on the basis of the above technical thought. That is, the optical glass of the present invention comprises, as essential components, at least one oxide selected from $La_2O_3$, $Gd_2O_3$, $Y_2O_3$, $Yb_2O_3$, $TiO_2$, $Nb_2O_5$ or $WO_3$, at least one oxide selected from MgO, CaO, SrO or BaO and $B_2O_3$ and contains $SiO_2$ as an optional component, wherein on the basis of mass, (a) the total content of $B_2O_3$ and $SiO_2$ is from 1 to 25%,
(b) the ratio of the total content of $B_2O_3$ and $SiO_2$ to the total content of $La_2O_3$, $Gd_2O_3$, $Y_2O_3$, $Yb_2O_3$, $TiO_2$, $Nb_2O_5$ and $WO_3$, $(B_2O_3+SiO_2)/(La_2O_3+Gd_2O_3+Y_2O_3+Yb_2O_3+TiO_2+Nb_2O_5+WO_3)$, is from 0.05 to 0.3, and
(c) the ratio of the total content of MgO, CaO, SrO and BaO to the total content of $La_2O_3$, $Gd_2O_3$, $Y_2O_3$, $Yb_2O_3$, $TiO_2$, $Nb_2O_5$ and $WO_3$, $(MgO+CaO+SrO+BaO)/(La_2O_3+Gd_2O_3+Y_2O_3+Yb_2O_3+TiO_2+Nb_2O_5+WO_3)$, is from 0.1 to 0.4, the optical glass having a refractive index (nd) of 2.000 or more and an Abbe's number (vd) of 27 or less, Values of the refractive index (nd) in claims and the specification are expressed by calculation to the third decimal place. The reason therefor is that when an optical glass has a refractive index of 2 or more, even a slight increase in refractive index has a great influence on various properties of the glass, such as a great decrease in stability of the glass.

Values of contents of glass components, total contents of glass components and contents of additives by percentages hereinafter stand for values by mass %, and ratios of contents or total contents of glass components hereinafter stand for ratios on the basis of mass, unless otherwise specified.

In the present invention, $B_2O_3$ is an essential component, and $SiO_2$ is an optional component. The total content of these two components $(B_2O_3+SiO_2)$ is limited to 1 to 25%. When the total content of $B_2O_3$ and $SiO_2$ is less than 1%, the stability of the glass is impaired, and the glass is devitrified. When it exceeds 25%, the refractive index of the glass cannot be increased. The total content of $B_2O_3$ and $SiO_2$ is preferably in the range of 2 to 18%, more preferably 3 to 14%.

The ratio of the total content of $B_2O_3$ and $SiO_2$ to the total content of the high-refractivity-imparting components is an important factor for the amount of those $La_2O_3$, $Gd_2O_3$, $Y_2O_3$ and $Yb_2O_3$ of the high-refractivity-imparting components which can be introduced without impairing the stability of the glass. Further, the ratio of the total content of MgO, CaO, SrO and BaO to the total content of the high-refractivity-imparting components is an important factor for the amount of $TiO_2$, $Nb_2O_5$ and $WO_3$ that can be introduced without impairing the stability of the glass.

When $(B_2O_3+SiO_2)/(La_2O_3+Gd_2O_3+Y_2O_3+Yb_2O_3+TiO_2+Nb_2O_5+WO_3)$ of the above two factors is smaller than 0.05, the glass stability is decreased, and the tendency to devitrification increases. When it is greater than 0.3, it is difficult to increase the refractive index of the glass up to the predetermined range. Therefore, $(B_2O_3+SiO_2)/(La_2O_3+Gd_2O_3+Y_2O_3+Yb_2O_3+TiO_2+Nb_2O_5+WO_3)$ is adjusted in the range of 0.05 to 0.3.

Further, $(MgO+CaO+SrO+BaO)/(La_2O_3+Gd_2O_3+Y_2O_3+Yb_2O_3+TiO_2+Nb_2O_5+WO_3)$ is less than 0.1, the glass stability decreases and the tendency to devitrification increases. When it is greater than 0.4, it is difficult to increase the refractive index up to the predetermined range. Therefore, $(MgO+CaO+SrO+BaO)/(La_2O_3+Gd_2O_3+Y_2O_3+Yb_2O_3+TiO_2+Nb_2O_5+WO_3)$ is adjusted in the range of 0.1 to 0.4.

The contents of the components are determined while the above conditions are satisfied such that the glass has a refractive index (nd) of 2.000 or more and an Abbe's number (vd) of 27 or less. By employing the above constitution, the present invention realizes an ultrahigh refractivity glass having such stability that the glass can be mass-produced.

Preferred embodiments of the invention will be explained below.

One example of preferred embodiments of the optical glass of the present invention is an optical glass containing 25 to 45% of a total of $La_2O_3$, $Gd_2O_3$, $Y_2O_3$ and $Yb_2O_3$, 18 to 38% of $TiO_2$, 5 to 15% of $Nb_2O_5$, 0 to 7% of $WO_3$, 0 to 10% of MgO, CaO and SrO and 7 to 17% of BaO.

$La_2O_3$, $Gd_2O_3$, $Y_2O_3$ and $Yb_2O_3$ are high-refractivity-imparting components and are also components for imparting the glass with low-dispersion properties. When the total content of $La_2O_3$, $Gd_2O_3$, $Y_2O_3$ and $Yb_2O_3$ is less than 25%, it is difficult to maintain the predetermined optical properties while maintaining the glass stability. When it exceeds 45%, the glass stability is decreased, and it is difficult to mass-produce the glass stably. Therefore, the above total content is preferably limited to 25 to 45%, more preferably to 28 to 40%, still more preferably to 30 to 38%.

Each of $TiO_2$, $Nb_2O_5$ and $WO_3$ works to give a greater refractive index than any one of $La_2O_3$, $Gd_2O_3$, $Y_2O_3$ and $Yb_2O_3$ and works to improve the glass in chemical durability and devitrification resistance. In particular, $TiO_2$ has the lowest molecular weight of the above high-refractivity-imparting components, so that $TiO_2$ impairs the glass stability to a less degree if it is introduced in a relatively large amount by mass %.

$TiO_2$ works to improve the glass in chemical durability and devitrification resistance in addition to the above effect. When the content of $TiO_2$ is less than 18%, it is difficult to produce these effects, and when it exceeds 38%, the glass stability decreases and the coloring of the glass may be intensified. In the present invention, therefore, the content of $TiO_2$ is preferably limited to 18 to 38%, more preferably to 20 to 36%, still more preferably 22 to 35%.

$Nb_2O_5$ works to improve the glass in devitrification resistance in addition to the above effect. When it is introduced to excess, the transmittance in a short wavelength region is decreased, so that the coloring is intensified. In the present invention, therefore, the content of $Nb_2O_5$ is preferably limited to 5 to 15%, more preferably to 6 to 13%, still more preferably to 6 to 12%.

$WO_3$ works to improve the devitrification resistance even when added in a small amount. However, when it is introduced to excess, the transmittance of the glass in a short wavelength region is decreased and the coloring of the glass is intensified. In the present invention, therefore, the content of $WO_3$ is preferably limited to 0 to 7%, more preferably to 0 to 3%. For decreasing bubbles in the glass, it is preferred to decrease the content of $WO_3$, and it is more preferred to introduce no $WO_3$. When priority is given to an improvement in devitrification resistance, the content of $WO_3$ to be introduced in the above range is preferably over 0%, more preferably 0.1% or more, still more preferably 0.5% or more.

MgO, CaO, SrO and BaO are components that effectively work to promote defoaming when used in the form of carbonates or nitrates and that make it possible to introduce a relatively large amount of $TiO_2$, $Nb_2O_5$ and $WO_3$ while maintaining the glass stability.

BaO works to give the largest refractive index of the above alkaline earth metal oxides and also works to improve the glass in resistance to coloring. When introduced to excess, BaO decreases the devitrification resistance. In the present invention, therefore, the content of BaO is preferably limited to 7 to 17%, more preferably to 8 to 15%, still more preferably 10 to 15%.

In the present invention, the total content of MgO, CaO and SrO is preferably in the range of 0 to 10%, more preferably 0 to 7%, still more preferably 0 to 3%. While MgO, CaO and SrO work as described above, they less work to increase the refractive index than BaO. The total content of MgO, CaO and SrO is generally adjusted such that it is smaller than the content of BaO alone.

Of the high-refractivity-imparting components, $TiO_2$ and $Nb_2O_5$ more work to increase the refractive index, and in view of an improvement in glass stability, it is preferred to introduce more $TiO_2$ than $Nb_2O_5$ since $TiO_2$ has a lower molecular weight than $Nb_2O_5$. However, the co-presence of $Nb_2O_5$ as a glass component can more improve the glass stability, and when the content of $Nb_2O_5$ is increased, the desired refractive index can be accomplished without introducing an excess amount of $TiO_2$, and the coloring of the glass caused by $TiO_2$ can be reduced. In the present invention, therefore, the ratio of the content of $Nb_2O_5$ to the content of $TiO_2$ ($Nb_2O_5/TiO_2$) is preferably adjusted to at least 0.1 but less than 0.5. When $Nb_2O_5/TiO_2$ is less than 0.1, the glass stability decreases and the tendency to coloring is intensified. When it is 0.5 or more, it is difficult to increase the refractive index while maintaining the glass stability.

In the present invention, for more increasing the refractive index while maintaining the glass stability and for improving the glass in meltability and moldability and decreasing the coloring of the glass, preferably, the ratio of the content of $SiO_2$ to the content of $B_2O_3$ is adjusted to 0.3 to 2.

As described above, $B_2O_3$ and $SiO_2$ are components for forming a glass network. In the present invention, they are also components that effectively decrease the melting temperature and the temperature for a viscous flow. Since, however, the refractive index is decreased when $B_2O_3$ is introduced to excess, the content of $B_2O_3$ is preferably limited to 1 to 15%, more preferably to 2 to 10%, still more preferably to 3 to 8%.

In the present invention, $SiO_2$ works to improve the devitrification resistance. However, when introduced to excess, $SiO_2$ degrades the glass in meltability and causes difficulties in stable production of the glass, so that the content of $SiO_2$ is preferably limited to 0 to 10%, more preferably to 1 to 8%, still more preferably 2 to 6%.

Of $La_2O_3$, $Gd_2O_3$, $Y_2O_3$ and $Yb_2O_3$, $La_2O_3$ is a component that is free from impairing the glass stability when introduced in a relatively large amount. However, when introduced to excess, $La_2O_3$ decreases the devitrification resistance and causes difficulties in the stable production of the glass. In the present invention, therefore, the content of $La_2O_3$ preferably limited to 25 to 40%, more preferably to 26 to 38%, still more preferably to 27 to 36

When introduced to excess, $Gd_2O_3$ decreases the devitrification resistance and causes difficulties in the stable production of the glass. In the present invention, therefore, the content of $Gd_2O_3$ is preferably limited to 0 to 10%, more preferably to 0 to 5%. Further, the intended glass can be obtained even without introducing $Gd_2O_3$.

When introduced to excess, $Y_2O_3$ also decreases the devitrification resistance and causes difficulties in the stable production of the glass. In the present invention, therefore, the content of $Y_2O_3$ is preferably limited to 0 to 5%, more preferably to 0 to 3%. Further, the intended glass can be obtained even without introducing $Y_2O_3$.

When introduced to excess, $Yb_2O_3$ also decreases the devitrification resistance and causes difficulties in the stable production of the glass. In the present invention, therefore, the content of $Yb_2O_3$ is preferably limited to 0 to 5%, more preferably to 0 to 3%. Further, the intended glass can be obtained even without introducing $Yb_2O_3$.

MgO, CaO and SrO work as described already. However, when the content of them is increased, the content of BaO cannot be increased. The content of MgO is preferably in the range of 0 to 7%, more preferably 0 to 3, while the intended glass can be obtained even without introducing MgO. The content of CaO is preferably in the range of 0 to 10%, more preferably 0 to 5, while the intended glass can be obtained even without introducing CaO. The content of SrO is preferably in the range of 0 to 7%, more preferably 0 to 3, while the intended glass can be obtained even without introducing SrO.

$ZrO_2$ is a component for increasing the refractive index, and it is effective for improving the devitrification resistance when introduced in a small amount. It is hence preferred to introduce over 0% of $ZrO_2$ in the present invention. When introduced to excess, $ZrO_2$ decreases the devitrification resistance and also decreases the meltability, so that the content of $ZrO_2$ is preferably limited to 2 to 10%, more preferably to 4 to 8%, still more preferably to 5 to 7.5%, particularly preferably to 5.5 to 7.5%.

ZnO is a component that not only works to increase the refractive index and the Abbe's number (a function to impart high-refractivity low-dispersion properties), but also works to improve the devitrification resistance and decrease the temperature for a viscous flow, and it is also a component that works to decrease the glass transition temperature. When introduced to excess, the glass stability is decreased, and it is difficult to obtain a glass that can be stably produced. In the present invention, therefore, the content of ZnO is preferably limited to 0 to 7%, more preferably to 0 to 5%, still more preferably 0 to 3%. Since ZnO works to sharpen the rising of spectral transmittance on a short wavelength edge even when added in a small amount, ZnO may be introduced in an amount of over 0% in the above range when priority is given to the above effect. Further, ZnO may be also introduced in an amount of over 0% in the above range when priority is given to decreasing the press-molding temperature by decreasing the glass transition temperature.

As described already, however, ZnO less works to maintain the glass stability than BaO when $TiO_2$ and $Nb_2O_5$ as high-refractivity-imparting components are increased in content.

When top priority is given to a further improvement in glass stability, therefore, the ratio of the content of ZnO to the content of BaO (ZnO/BaO) is preferably adjusted in the range of 0 to 0.12, more preferably in the range of 0 to 0.100, still more preferably in the range of 0 to 0.090, yet more preferably in the range of 0 to 0.080, most preferably in the range of 0 to 0.050.

The above properties of ZnO are applicable to both a glass having a refractive index (nd) in the range of 2.000 to 2.100 and a glass having a refractive index (nd) in the range over 2.100.

$Al_2O_3$ works to improve the devitrification resistance even when added in a small amount. However, $Al_2O_3$ decreases the refractive index when added to excess. In the present invention, therefore, the content of $Al_2O_3$ is preferably limited to 0 to 5%, more preferably to 0 to 3%, still more preferably 0 to 1%. When priority is given to increasing the refractive index, it is preferred to introduce no $Al_2O_3$.

$Li_2O$ decreases the glass transition temperature and it has an effect on decreasing the heating temperature when the glass is softened by re-heating. Alkali metal oxides have the above function, and of these, $Li_2O$ works the most effectively. However, when it is introduced to excess, it decreases the glass stability and also decreases the refractive index, so that the content of $Li_2O$ is preferably limited to 0 to 5%, more preferably to 0 to 3%, still more preferably 0 to 1%. When it is intended to obtain a higher refractive index while maintaining the glass stability, it is preferred to introduce no $Li_2O$.

$Na_2O$ also decreases the glass transition temperature and it has an effect on decreasing the heating temperature when the glass is softened by re-heating. However, when it is introduced to excess, it decreases the glass stability and also decreases the refractive index, so that the content of $Na_2O$ is preferably limited to 0 to 5%, more preferably to 0 to 3%, still more preferably 0 to 1%. When it is intended to obtain a higher refractive index while maintaining the glass stability, it is preferred to introduce no $Na_2O$.

$K_2O$ also decreases the glass transition temperature and it has an effect on decreasing the heating temperature when the glass is softened by re-heating. However, when it is introduced to excess, it decreases the glass stability and also decreases the refractive index, so that the content of $K_2O$ is preferably limited to 0 to 5%, more preferably to 0 to 3%, still more preferably 0 to 1%. When it is intended to obtain a higher refractive index while maintaining the glass stability, it is preferred to introduce no $K_2O$.

For obtaining a higher refractive index while maintaining the glass stability, the total content of $Li_2O$, $Na_2O$ and $K_2O$ is preferably adjusted to 0 to 5%, more preferably to 0 to 3%, still more preferably to 0 to 1%, and it is yet more preferred to introduce no alkali metal oxide.

$Ta_2O_5$ works not only to increase the refractive index but also to impart the glass with low-dispersion properties, while it degrades the meltability when introduced to excess. Further, since the raw material cost for $Ta_2O_5$ is high, the content of $Ta_2O_5$ in the present invention is preferably limited to 0 to 5%, more preferably to 0 to 3%, still more preferably to 0 to 1%. From the viewpoint of the raw material cost, it is yet more preferred to introduce no $Ta_2O_5$.

$Bi_2O_3$ works to decrease the glass transition temperature even when added in a small amount. However, when added to excess, $Bi_2O_3$ decreases the glass stability and intensifies the tendency to coloring. In the present invention, therefore, the content of $Bi_2O_3$ is preferably limited to 0 to 5%, more preferably to 0 to 3%, still more preferably 0 to 1%, and it is yet more preferred to introduce no $Bi_2O_3$.

$GeO_2$ has the same effect as that of $SiO_2$. However, when introduced to excess, it decreases the glass stability. $GeO_2$ is also a very expensive component. In the present invention, the content of $GeO_2$ is preferably limited to 0 to 5%, more preferably to 0 to 3%, still more preferably 0 to 1%, and it is yet more preferred to introduce no $GeO_2$.

As a refining agent, $Sb_2O_3$ can be added in a small amount. The amount of $Sb_2O_3$ is preferably limited to 0 to 1%, more preferably to 0 to 0.5%, still more preferably to 0 to 0.3%.

As a refining agent, SnO can be added in a small amount as well. The amount of SnO is preferably limited to 0 to 1%, more preferably to 0 to 0.5%, still more preferably to 0 to 0.3%.

As a refining agent, $As_2O_3$ can be also added in an amount that is in the amount range of $Sb_2O_3$. Since, however, $As_2O_3$ is toxic, it is preferred to use no $As_2O_3$ from the viewpoint of the reduction of an environmental burden.

$Ga_2O_3$ and $In_2O_3$ may be introduced in a small amount each, while they impair the glass stability when added to excess. Further, since they are expensive components, the content of each of $Ga_2O_3$ and $In_2O_3$ is preferably limited to 0 to 5%, more preferably to 0 to 3%, still more preferably 0 to 1%, and it is yet more preferred to introduce none of them.

$P_2O_5$ may be added in a small amount, but it is not in particular any essential component for achieving the object of the present invention. Therefor, the content of $P_2O_5$ is preferably limited to 0 to 5%, more preferably to 0 to 3%, still more preferably 0 to 1%, and it is yet more preferred to introduce no $P_2O_5$.

On the other hand, lead and its compounds, Cd and its compound, Cr and its compound and Tl and its compounds should be precluded from the glass due to their toxicity. Similarly, radioactive substances such as U, Th, Ra, etc., should be precluded. Apart from coloring the glass as required, preferably, Cu, Cr, V, Fe, Ni, Co, Pr, Nd, Er, Ho, etc., which intensely color the glass, are not introduced. Further, Te and Se should be precluded from use by taking account of their environmental impact. In addition to these, preferably, expensive components such as Cs, Rb, Hf, etc., should be precluded from use since they simply increase the production cost.

In the optical glass of the present invention, further, high refractivity can be attained without introducing $Lu_2O_3$, and $Lu_2O_3$ is expensive, so that it is preferred to introduce no $Lu_2O_3$ when economic performances are taken into account.

Further, since F has a detrimental effect on the homogeneity of the glass, it is also preferred to introduce no F.

For further improving the glass in refractivity and stability, preferably, the total content of $B_2O_3$, $SiO_2$, $La_2O_3$, $Gd_2O_3$, $Y_2O_3$, $Yb_2O_3$, $TiO_2$, $Nb_2O_5$, $WO_3$, MgO, CaO, SrO, BaO, ZnO, $ZrO_2$, $Ta_2O_5$, $Bi_2O_3$, $GeO_2$, $Sb_2O_3$ and SnO is adjusted to over 90%. The above content is more preferably adjusted to over 95%, still more preferably to over 98%, yet more preferably 99%, further more preferably to 100%.

Above all, the total content of $B_2O_3$, $SiO_2$, $La_2O_3$, $Gd_2O_3$, $Y_2O_3$, $Yb_2O_3$, $TiO_2$, $Nb_2O_5$, $WO_3$, BaO, ZnO, $ZrO_2$, $Ta_2O_5$, $Bi_2O_3$, $GeO_2$, $Sb_2O_3$ and SnO is preferably adjusted to over 90%, more preferably to over 95%, still more preferably to over 98%, yet more preferably to over 99%, further more preferably to 100%.

Examples of preferred glasses defined as above include a glass having a $B_2O_3$, $SiO_2$, $La_2O_3$, $TiO_2$, $Nb_2O_5$, $WO_3$, BaO, ZnO, $ZrO_2$, $Sb_2O_3$ and SnO total content of over 90%, a glass having a $B_2O_3$, $SiO_2$, $La_2O_3$, $TiO_2$, $Nb_2O_5$, $WO_3$, BaO, ZnO, $ZrO_2$, $Sb_2O_3$ and SnO total content of over 95%, a glass having a $B_2O_3$, $SiO_2$, $La_2O_3$, $TiO_2$, $Nb_2O_5$, $WO_3$, BaO, ZnO, $ZrO_2$, $Sb_2O_3$ and SnO total content of over 98%, a glass having a $B_2O_3$, $SiO_2$, $La_2O_3$, $TiO_2$, $Nb_2O_5$, $WO_3$, BaO, ZnO, $ZrO_2$, $Sb_2O_3$ and SnO total content of over 99%, a glass having a $B_2O_3$, $SiO_2$, $La_2O_3$, $TiO_2$, $Nb_2O_5$, $WO_3$, BaO, ZnO, $ZrO_2$, $Sb_2O_3$ and SnO total content of 100%, a glass having a $B_2O_3$, $SiO_2$, $La_2O_3$, $TiO_2$, $Nb_2O_5$, $WO_3$, BaO, $ZrO_2$, $Sb_2O_3$ and SnO total content of over 95%, a glass having a $B_2O_3$, $SiO_2$, $La_2O_3$, $TiO_2$, $Nb_2O_5$, $WO_3$, BaO, $ZrO_2$, $Sb_2O_3$ and SnO total content of over 98%, a glass having a $B_2O_3$, $SiO_2$, $La_2O_3$, $TiO_2$, $Nb_2O_5$, $WO_3$, BaO, $ZrO_2$, $Sb_2O_3$ and SnO total content of over 99% and a glass having a $B_2O_3$, $SiO_2$, $La_2O_3$, $TiO_2$, $Nb_2O_5$, $WO_3$, BaO, $ZrO_2$, $Sb_2O_3$ and SnO total content of 100%.

Preferred glass compositions classified on the basis of refractive indices will be explained below. (Glass compositions having a refractive index (nd) in the range of 2.000 or more but less than 2,050)

Preferred glass compositions having a refractive index (nd) of 2.000 or more but less than 2,050 will be explained below.

The ratio of $(B_2O_3+SiO_2)/(La_2O_3+Gd_2O_3+Y_2O_3+Yb_2O_3+TiO_2+Nb_2O_5+WO_3)$ is preferably in the range of 0.10 to 0.30, more preferably 0.13 to 0.27, still more preferably 0.15 to 0.25.

The ratio of $(MgO+CaO+SrO+BaO)/(La_2O_3+Gd_2O_3+Y_2O_3+Yb_2O_3+TiO_2+Nb_2O_5+WO_3)$ is preferably in the range of 0.10 to 0.40, more preferably 0.15 to 0.30, still more preferably 0.20 to 0.27.

The ratio of $SiO_2/B_2O_3$ is preferably in the range of 0.60 to 0.80, more preferably 0.63 to 0.78, still more preferably 0.65 to 0.75.

The ratio of $Nb_2O_5/TiO_2$ is preferably 0.20 or more but less than 0.50, more preferably in the range of 0.20 to 0.48, still more preferably 0.21 to 0.45, yet more preferably 0.23 to 0.43.

The range of the above refractive index is a range in which the refractive index is relatively low in the present invention, so that the above four ratios are in relatively large ranges.

(Glass Compositions Having a Refractive Index (nd) in the Range of 2,050 or More But Less than 2,100)

When the refractive index (nd) is 2,050 or more but less than 2,100, the ratio of $(B_2O_3+SiO_2)/(La_2O_3+Gd_2O_3+Y_2O_3+Yb_2O_3+TiO_2+Nb_2O_5+WO_3)$ is preferably in the range of 0.10 to 0.25, more preferably 0.10 to 0.2.

The ratio of $(MgO+CaO+SrO+BaO)/(La_2O_3+Gd_2O_3+Y_2O_3+Yb_2O_3+TiO_2+Nb_2O_5+WO_3)$ is preferably in the range of 0.10 to 0.40, more preferably 0.15 to 0.30, still more preferably 0.15 to 0.25.

The ratio of $SiO_2/B_2O_3$ is preferably in the range of 0.40 to 0.80, more preferably 0.45 to 0.75, still more preferably 0.50 to 0.70.

The ratio of $Nb_2O_5/TiO_2$ is preferably in the range of 0.20 to 0.45, more preferably 0.21 to 0.45, still more preferably 0.23 to 0.43.

(Glass Compositions Having a Refractive Index (nd) in the Range Over 2,100)

When the refractive index (nd) is in the range over 2.100, the ratio of $(B_2O_3+SiO_2)/(La_2O_3+Gd_2O_3+Y_2O_3+Yb_2O_3+TiO_2+Nb_2O_5+WO_3)$ is preferably in the range of 0.05 to 0.20, more preferably 0.06 to 0.15, still more preferably 0.07 to 0.13. The ratio of $(MgO+CaO+SrO+BaO)/(La_2O_3+Gd_2O_3+Y_2O_3+Yb_2O_3+TiO_2+Nb_2O_5+WO_3)$ is preferably in the range of 0.10 to 0.30, more preferably 0.15 to 0.25, still more preferably 0.15 to 0.20. Since the range of the refractive index is very high, the contents of high-refractivity-imparting components are increased while maintaining the glass stability at a level capable of mass-production, so that the above four ranges are relatively small.

In the present invention, with an increase in refractive index, the coloring degree increases. The present invention uses λ70 and λ5 for the coloring degree. The coloring degree λ70 refers to a value obtained by preparing a 10 mm thick glass sample having two optically polished surfaces in parallel with each other, causing light having a wavelength of 280 to 700 nm to enter the glass sample in the direction perpendicular to one of the two surfaces, measuring an external transmittance (including a reflection loss on the glass sample surface) of light that comes out of the other surface, expressing a wavelength at which the external transmittance comes to be 70% as a value in the unit of 10 nm and rounding off a number after the decimal point. For example, when the wavelength at which the external transmittance comes to be 70% is 493 nm, the λ70 will be 49. The λ5 refers to a value obtained by expressing a wavelength at which the external transmittance comes to be 5% as a value in the unit of 10 nm and rounding off a number after the decimal point (that is, rounding off the last digit). For example, when the wavelength at which the external transmittance comes to be 5% is 376 nm, the λ5 will be 38. It is not necessarily required to use a 10 nm thick sample for measuring the λ70 and λ5, and there may be employed a constitution in which a sample having a different thickness is measured and a measurement value is converted.

In preferred embodiments of the present invention, when the refractive index (nd) is 2.000 or more but less than 2.050, the λ70 is 47 or less and the λ5 is 38 or less, when the refractive index (nd) is 2.050 or more but less than 2.100, the λ70 is 53 or less and the λ5 is 39 or less, and when the refractive index (nd) is 2.200 or more, the λ70 is 67 or less and the λ5 is 40 or less. The optical glass of the present invention is suitable for a glass material for various optical elements since it can have an external transmittance of over 70% in a wavelength region that is a region where the wavelength is longer than a wavelength at which the above external transmittance is 70% and that is up to 700 nm.

When a glass is used as a material for an optical element constituting an image-sensing optical system, the coloring caused by light absorption of the glass on the short wavelength end of the visible light region sensitively affects on whether or not the optical system performs well. The above coloring is a combination of a coloring caused by the glass composition per se and a coloring caused by the inclusion of platinum ion dissolved in the glass from a vessel made of platinum or platinum alloy during melting, refining and homogenization. With an increase in the melting temperature, more platinum is dissolved. For even modestly decreasing the coloring caused by platinum ion, therefore, it is required to decrease the melting temperature and the refining temperature to a great extent, and there are hence involved problems that poor freedom from bubbles, and the like. Therefore, even the modest decreasing of the above coloring caused by the glass composition is significant.

In the optical glass of the present invention, the glass transition temperature (Tg) can be controlled such that it is 730° C. or lower, so that there can be accomplished an improvement in press-moldability and a longer lifetime of an annealing furnace. However, when the glass transition temperature (Tg) is decreased to excess, there may be caused disadvantages such as a decrease in refractive index, impairment to production stability, etc., so that it is desirable to adjust the glass transition temperature (Tg) to 730° C. or higher.

The glass transition temperature also tends to increase with an increase in refractive index. It is therefore preferred to adjust the glass transition temperature to 700° C. or lower when the refractive index (nd) is 2.000 or more but less than 2.050, it is therefore preferred to adjust the glass transition temperature to 710° C. or lower when the refractive index (nd) is 2.050 or more but less than 2.100, and it is therefore preferred to adjust the glass transition temperature to 730° C. or lower when the refractive index (nd) is 2.100 or more.

The present invention also provides a press-molding glass gob formed of an optical glass having the above properties, an optical element blank formed of the above optical glass for producing an optical element by grinding and polishing and an optical element formed of the above optical glass.

The process for the production of a glass shaped material and the process for the production of a press-molding glass gob will be explained below.

[Process for the Production of Glass Shaped Material]

The process for the production of a glass shaped material, provided by the present invention, comprises providing a mold having a through hole that has an inlet and an outlet, causing a molten glass flow to flow from the inlet into said through hole to fill said through hole with the molten glass flow and continuously withdrawing a glass material shaped in said through hole from the outlet of the through hole.

A preferred embodiment of the above process is a process for the production of a glass shaped material, which comprises providing a mold having a through hole, causing molten glass flowing out of a pipe to continuously flow through an inlet of said through hole and continuously withdrawing glass through an outlet of said through hole thereby to shape the glass into a solid glass, wherein a circumferential surface of the glass in said through hole is brought into an inner wall of said through hole in at least one section (cooling section) in said through hole to absorb heat of said glass from said circumferential surface, and the glass from said cooling section is caused to pass through a surrounding having a temperature equivalent to, or higher than, a temperature that is lower than the glass transition temperature (Tg) of said glass by 150° C. (Tg−150° C.), to bring the temperature of inner central portion of said glass and the temperature of the circumferential surface of said glass close to each other.

In the process for the production of a glass shaped material, provided by the present invention, a mold having a through hole is used, and a molten glass flowing out of a pipe is caused to continuously flow into the above through hole through its inlet and is continuously withdrawn through the outlet of the above through hole thereby to shape the glass into a solid glass.

For producing an optically uniform glass shaped material, it is essential to keep the molten glass flow in the mold from causing a turbulent flow. When a hollow glass is formed, there is provided a mechanism that partially stops the glass flow in the mold from flowing into a hollow portion, that is, a portion where no glass is to be filled. For example, when it is intended to form a hollow portion in the central axis portion of a rod-like glass shaped material, a bar having high heat resistance like the mold is arranged in the mold along the central axis direction of the mold, and a molten glass is caused to flow into the mold in a manner in which the molten glass wraps the bar. In this case, the mechanism for stopping the glass flow from filling in the hollow portion corresponding to the above bar causes a turbulent flow of the molten glass. On the other hand, the present invention seeks to obtain an optically uniform glass shaped material, and it should be understood that the glass shaped material is a solid glass shaped material having no hollow portion.

The mold for use in the present invention has a through hole, and the through hole has an inlet through which a molten glass is caused to flow in and an outlet through which a solid glass is withdrawn. In the present invention, a molten glass flowing out of a molten glass outflow pipe is caused to continuously flow into the through hole through the inlet. And, in at least one section (cooling section) in the above through hole, the circumferential surface of the glass before solidification from a molten state, that is, that surface of the glass which faces in the direction perpendicular to the moving direction of the glass as a whole is brought into contact with the inner wall of the above through hole, thereby to absorb heat of the glass from its circumferential surface. In this manner, the occurrence of striae in a glass which is liable to have striae, in particular a glass having a low viscosity when it is caused to flow out or a fluorine-containing glass, can be reduced or prevented. In particular, the entire circumferential surface is brought into contact with the inner wall of the through hole so that no space is left between the circumferential surface and the inner wall, whereby the glass can be efficiently cooled.

For preventing the devitrification of the glass, preferably, the temperature of a molten glass to flow out of the pipe into the through hole through the inlet is adjusted to a temperature around, or higher than, the liquidus temperature of the glass as will be described later. Specifically, the temperature of the molten glass to flow in through the inlet is preferably adjusted to a temperature in the range of (liquidus temperature +10° C.) to (liquidus temperature +100° C.). It can be considered that the surface temperature of the molten glass flow to flow into the through hole through the inlet is the same as the temperature of the lower end of the flow pipe, and the temperature of the lower end of the flow pipe can be measured with a thermocouple. Further, the temperature in the inner central portion of the molten glass flow to flow into the through hole can be measured by inserting a thermocouple into the molten glass. The temperature difference between the thus-measured surface temperature and inner central portion temperature is preferably adjusted to 120° C. or less, more preferably to 60° C. or less, still more preferably 50° C. or less.

The temperature of the mold (the inner wall of the through hole) is preferably determined by taking into account (1) no glass fusion-bonding, (2) spreading of the molten glass in the through hole without leaving any space, and the like. The mold may be provided with a heater and a condenser as required for temperature control. When the surface temperature of the glass shaped material at the outlet of the through hole is too high, the surface temperature can be adjusted by air-cooling the mold or cooling the mold with a water-cooling plate or the like, and when the surface temperature is too low, it can be adjusted by heating the mold with a heater.

The temperature of the inner wall of upper portion of the through hole in the above cooling section can be set, for example, at a temperature that is lower than the glass transition temperature by 50 to 150° C. When the entire glass flow passage in the through hole is used as a cooling section as will be described later, the temperature of the through hole inner wall in the vicinity of the inlet can be set at a temperature lower than the glass transition temperature by 20 to 50° C. When a shaping furnace is used, there can be employed a constitution in which the temperature in the vicinity of the outlet is set at a temperature lower than the glass transition temperature by 100 to 400° C. and the temperature in an in-between portion between the inlet and the outlet is equivalent to, or lower than, the temperature in the vicinity of the inlet and is equivalent to, or higher than, the temperature in the vicinity of the outlet. The temperature of inner wall of the through hole can be measured by inserting a thermocouple through a bore made in the mold such that the thermocouple reaches close to the inner wall of the through hole.

In the cooling section, the circumferential surface of the glass is brought into contact with the inner wall of the through hole to absorb heat as described above, whereby the cooling of the glass is promoted and the occurrence of striae can be prevented or reduced. With regard to a glass having a low viscosity when it is caused to flow out or a fluorine-containing glass, however, when the inner portion and the surface of the glass withdrawn from the mold have too large a temperature difference, the glass may be broken or damaged due to an internal stress. In the present invention, therefore, the glass from the above cooling section is caused to pass through a surrounding having a temperature equivalent to, or higher than, a temperature that is lower than the glass transition temperature (Tg) of the glass by 150° C. (Tg −150° C.), whereby the temperature of inner central portion of the glass and the temperature of circumferential surface of the glass are brought close to each other. This constitution can prevent the glass that is rapidly cooled in the cooling section for reducing and preventing striae from being broken or damaged due to an internal stress after it has passed through the cooling section.

The above cooling section can be the entire glass flow passage in the through hole. In this case, the above surrounding having a temperature of the above (Tg −150° C.) or higher can be an atmosphere to which the glass withdrawn from the through hole outlet is to be exposed. When the temperatures of the inner central portion and the circumferential surface of the glass are brought close to each other by causing the glass withdrawn from the through hole outlet to pass through the atmosphere having a temperature of (T−150° C. or lower) as described above, preferably, the glass withdrawn from the through hole outlet is immediately placed in the above atmosphere.

In the present invention, further, there may be employed a constitution in which the inside of the through hole is largely separated into two sections such as inlet side and outlet side sections, the circumferential surface of the glass is brought into contact with the through hole inner wall on the inlet side section to absorb heat of the glass and the temperature of the through hole inner wall on the outlet side is controlled so as to have a temperature equivalent to, or higher than, a temperature that is lower than the glass transition temperature (Tg) of the glass by 150° C. (Tg −150° C.). In this case, the above surrounding having a temperature of the above (Tg −150° C.) or higher is the above temperature-controlled section on the outlet side. The above section on the inlet side and the above section on the outlet side may be heat-insulated so that the temperatures in these two sections can be easily controlled.

In any case, the temperature of the inner central portion of the glass and the temperature of circumferential surface of the glass are brought close to each other preferably by causing the glass to pass through a surrounding having a temperature that is equivalent to, or higher than, a temperature lower than the glass transition temperature by 100° C. (Tg −100° C.), more preferably by causing the glass to pass through a surrounding having a temperature that is equivalent to, or higher than, a temperature lower than the glass transition temperature by 50° C. (Tg −50° C.), still more preferably by causing the glass to pass through a surrounding having a temperature that is equivalent to, or higher than, a temperature lower than the glass transition temperature by 50° C. (Tg −50° C.).

When the temperature of the above surrounding is set at too low a temperature, if a shaping furnace is used for bringing the temperature of the inner central portion of the glass and the temperature of circumferential surface of the glass close to each other, the shaping furnace is required to have a large length. Further, if a mold is used for bringing the temperature of the inner central portion of the glass and the temperature of circumferential surface of the glass close to each other, the mold is required to have a large length. As a result, a large space is required, or it is difficult to control the rate of withdrawing the glass from the through hole outlet.

Further, when a glass shaped material is split, if the temperature of the glass becomes too low, the Young's modulus of the glass increases, so that it is difficult to split the glass. In the present invention, the glass is in a continuous state where a molten glass is continued to a glass shaped material. When the glass shaped material is split with a big force, its impact may reach the molten glass in a mold to cause a turbulent glass flow or the like, so that there may be caused a failure in obtaining a quality glass shaped material. While a wire saw, a grinder, or the like may be employed for cutting, undesirably, it is required to cool the glass to a temperature around room temperature, and a space that is as long as several tens meters for gradual cooling is required for the above cooling. For splitting the glass shaped material in an excellent state, the temperature of the glass is preferably around its glass transition temperature or lower, more preferably a temperature that is equivalent to, or higher than, a temperature lower than the glass transition temperature by 150° C. and that is the glass transition temperature or lower, still more preferably a temperature that is equivalent to, or higher than, a temperature lower than the glass transition temperature by 100° C. and that is the glass transition temperature or lower, yet more preferably a temperature that is equivalent to, or higher than, a temperature lower than the glass transition temperature by 50° C. and that is the glass transition temperature or lower, and the splitting is particularly preferably carried out around the glass transition temperature. By taking account of the above point, the temperature of inner central portion of the glass and the temperature of circumferential surface of the glass are brought close to each other in a surrounding having a temperature of (Tg−150° C.) or higher. After the temperature of inner central portion of the glass and the temperature of circumferential surface of the glass are brought close to each other, that is, after a strain is reduced, the glass shaped material is split or cut, whereby the glass shaped material can be split or cut in a predetermined position without breaking or damaging it.

The upper limit of the temperature employed for bringing the temperature of inner central portion of the glass and the temperature of circumferential surface of the glass close to each other can be a temperature at which the outer form (the form of a cross section perpendicular to the withdrawing direction) of the shaped glass is free from a deformation that might be caused by rapid cooling of circumferential surface of the glass, and the above upper limit temperature is preferably the softening temperature of the glass or lower, more preferably lower than the softening temperature.

When the above operation is carried out in an atmosphere, there can be employed a constitution in which a furnace called a shaping furnace is connected to the through hole outlet, the glass withdrawn from the through hole outlet is directly moved into the furnace and the glass is withdrawn from the furnace when the temperature of the inner central portion and the temperature of the circumferential surface come close to each other. The time period for which the glass passes through the interior of the furnace can be a period for which the internal stress of the glass shaped material can be decreased to such an extent that the glass is not explosively broken or that the glass is not broken or damaged by a slight thermal shock or mechanical impact. For this purpose, the length of the shaping furnace along the glass withdrawing direction can be determined as required by experiments or the like while taking account of the glass withdrawing rate and the time period for which the glass passes through the inside of the furnace. The temperature of the atmosphere in the furnace can be controlled, for example, by controlling the current value of a heater set in the furnace or the time period for which the current flows.

In the present invention, the temperature of inner central portion of the glass and the temperature of circumferential surface of the glass are brought close to each other, so that the temperature difference between the inner central portion and the circumferential surface can be adjusted to 0 to 150° C., preferably 0 to 100° C., more preferably 0 to 50° C. Differing from an annealing procedure in which a glass is gradually cooled to a temperature around room temperature, the above operation of bringing the temperature of inner central portion of the glass and the temperature of circumferential surface of the glass close to each other is completed in a state where the glass has a temperature considerably higher than room temperature.

The mold for use in the present invention will be explained below.

In the mold, the ratio of the inner diameter of the through hole to the length of the through hole (inner diameter/length) is preferably in the range of 1/50 to 3/1, more preferably in the range of 1/20 to 2/1 from the viewpoint of prevention of the melt-bonding, spreading, bending, etc., of the glass. The inner diameter of the through hole can be determined depending upon the outer diameter of the glass shaped material to be obtained, and it can be, for example, 10 to 100 mm, while the inner diameter shall not be limited thereto.

For not stopping the glass from moving in the mold, desirably, the form of cross section perpendicular to the glass moving direction in any portion of the through hole is in agreement with the form of that cross section of the glass shaped material which is perpendicular to the moving direction of the glass shaped material. When the temperature distribution of the mold is not controlled, the mold temperature on the inlet side is higher than the mold temperature on the outlet side during shaping. When the through hole is formed so as to have a constant inner diameter lengthwise at room temperature, therefore, the inner diameter of the through hole comes to be non-constant along the moving direction of the glass due to the thermal expansion of the mold during shaping. In the present invention, preferably, the inner diameter of the through hole is increased from the inlet to the outlet so that the above inner diameter comes to be constant along the moving direction of the glass during shaping, and the through hole is tapered and the gradient of the tapering is determined so that the through hole is slightly widened toward the outlet, by taking account of the thermal expansion of the mold. In particular, when a glass having a low viscosity when it flows out or a mold formed of a material to which a glass has high wettability is used, it is desirable to increase the gradient of the tapering for preventing the sticking of glass to the mold.

The material for the mold for use in the present invention is preferably selected from refractory metals such as carbon, a casting, nickel, and the like. In the present invention, the step of producing a glass shaped material from a molten glass is preferably carried out in an inert atmosphere from the viewpoint of prevention of the deterioration of the mold.

When an atmosphere influences the quality of the shaped material like a fluorine-containing glass to be described later, it is preferred to surround the molten-glass-flowing passage between the outlet of the flow pipe and the inlet of the through hole to control the atmosphere therein. In the present invention, the area of that surface of a high-temperature glass which is exposed to an atmosphere is not so large as that in a conventional shaping method, so that the object of controlling the atmosphere can be accomplished by surrounding the necessary minimum space as described above and replacing the internal atmosphere with a desired gas, instead of hermetically closing the forward end of the pipe and the entire shaping apparatus and replacing the atmosphere therein. For suppressing the volatilization from the surface of a high-temperature glass and reducing or preventing the "wetting-back" of the outer circumference of forward end of the pipe so that the shaped glass is improved in quality, it is preferred to employ a dry atmosphere, an inert gas atmosphere or an inert gas atmosphere in a dry state as the above atmosphere.

The above method is suitable for reducing or preventing striae when a shaped material is formed from a glass containing a volatile component such as a fluorine component, regardless of the employment of the step of bringing the temperature of inner central portion of the glass and the temperature of circumferential surface of the glass close to each other by causing the glass from the cooling section to pass through the surrounding having a temperature equivalent to, or higher than, the temperature that is lower than the glass transition temperature thereof by 150° C. The above method is particularly preferred when the shaped material is produced from a fluorophosphate glass.

A preferred embodiment of the present invention is a method which uses a mold having a through hole having an inlet and an outlet which communicate with each other as straight as a straight line. In this method, preferably, the mold is arranged such that the inlet is in a higher position than the outlet and a molten glass flows down into the through hole such that the liquid level of molten glass being in the through hole is constant.

FIG. 1 shows one example of the above preferred embodiment. FIG. 1 is a schematic drawing of one embodiment of a production apparatus for use in the process for the production of a glass shaped material, provided by the present invention. As shown in FIG. 1, in a process in which a molten glass flowing down in a pipe 1 is caused to flow into a mold 2 and the glass moves from a high position to a low position, the glass is shaped into a glass shaped material. When the passage which the glass is caused to flow into and passes through is a through hole having an inlet and an outlet which communicate with each other as straight as a straight line as shown in FIG. 1, the molten glass more smoothly flows in the mold, the flow is not easily rendered turbulent, and as a result an optically uniform glass shaped material can be more stably produced.

In the present invention, preferably, the mold 2 is arranged such that the central axis of the through hole becomes vertical (in agreement with a vertical line) as shown in FIG. 1. However, the mold may be arranged such that the above central axis is inclined from the vertical line. When the mold 2 is arranged such that the central axis is vertical, the flow of the molten glass that flows vertically downward in the pipe 1 proceeds in the mold toward the outlet without changing the direction of the flow as a whole, so that the turbulence of the flow in the mold is further reduced, and the striae-decreasing effect can be further improved.

Further, a glass shaped material having a straight form can be obtained by causing a molten glass to flow into the through hole having an inlet and outlet which communicate with each other as straight as a straight line. The glass shaped material having a straight form is advantageous for producing a press-molding glass gob by processing the glass shaped material or for producing an optical element. For obtaining a glass shaped material having a central axis that is as straight as a straight line and having a cross section perpendicular to the central axis which cross section is constant in form and dimensions in any position, it is desirable to use a mold having a through hole having an inlet and an outlet which are communicate with each other as straight as a straight line and uniformly cool the glass withdrawn from the mold. By carrying out the uniform cooling, the contraction of the glass can be rendered uniform and the linearity of the glass shaped material can be maintained. Further, the present invention has an advantage that the linearity of the glass shaped material can be improved by bringing the temperature of the inner central portion of the glass and the temperature of the circumferential surface of the glass close to each other as described above For stabilizing shaping conditions, preferably, the liquid level of molten glass in the through hole is maintained at a constant level. For this purpose, it is sufficient to employ a constitution in which the molten glass is caused to flow out of the pipe 1 at a constant rate and the glass is withdrawn from the outlet at a constant rate. Since, however, the flow rate of the molten glass can slightly vary with the passage of time, it is desirable to control the rate of withdrawal of the glass from the mold such that the above liquid level is constantly at the same level.

The withdrawal of the glass from the through hole outlet will be explained below.

As a method for withdrawing the glass from the through hole outlet in the present invention, there can be employed any one of a method of allowing the glass to move based on its own weight, a method of withdrawing the glass from the through hole outlet and a method of applying a withdrawing force to the glass in addition to the force of gravity on the glass. Further, since the glass is hardly stretched by the withdrawing, the rate of withdrawing the glass corresponds to the rate of movement of the above glass shaped material withdrawn. The controlling of the withdrawing rate means that the force for taking up the glass shaped material is controlled so as to attain a withdrawing rate as desired or that, when the glass moves downward at a rate greater than a predetermined rate due to its own weight, the withdrawing rate is controlled so as to attain a predetermined rate by applying a force that reduces the moving rate of the glass shaped material.

When the rate of withdrawing the glass from the through hole outlet is too large or too small, the height of liquid level of the molten glass in the through hole does not remain constant, and particularly when the above rate is too large, a gap is formed between the inner wall of the through hole and the glass, so that the glass shaped material is no longer uniform in dimensions. In an extreme case when the above rate is too small, molten glass flows over the mold and the glass shaped material becomes defective in form. It is therefore preferred to control the above withdrawing rate.

In one example of controlling the rate of withdrawing the glass shaped material, as shown in FIG. 1, that surface (circumferential surface) of the glass shaped material withdrawn from the through hole which is formed by the inner wall of the through hole is held with rollers to control the rate of withdrawing the glass shaped material from the outlet. For example, in a state where the circumferential surface of the glass shaped material is held between a plurality of rollers 3 so that the rollers 3 and the circumferential surface 6 of the glass shaped material do not slip on each other, the rotation rates of the rollers 3 are controlled to control the rate of downward movement of the glass shaped material. Desirably, a plurality of sets of the rollers 3 are provided along the passage for the glass shaped material and the gravity working on the glass shaped material is separated and supported with the rollers 3. In this manner, the uncontrollability of the withdrawing rate caused by slipping of the glass shaped material between the rollers can be more reliably prevented. The above rollers are desirably provided in a shaping furnace 7. After the glass shaped material passes through the shaping furnace 7, it has a reduced strain, and that portion of the glass shaped material which is below the rollers 3 is in a state where it is suspended with the rollers 3. When a glass supported below the rollers 3 is separated from the upper portion of the glass shaped material, therefore, the separation has no detrimental effect on the control of the rate of withdrawing the glass.

Further, since the glass shaped material from the shaping furnace has a reduced strain, the separation of the glass shaped material does not in any case break the glass. Further, when the glass shaped material is annealed and then cut or split in a position after the above support position, advantageously, it is not required to discontinue the casting of the molten glass into the mold. In this manner, there is no excess increase in the weight of the glass shaped material to be supported, which is advantageous in respect of the control of the rate of withdrawing the glass. Further, a glass shaped material separated can be transferred to a next step while a glass shaped material is shaped, which can improve the productivity of the glass shaped material.

On the other hand, when the force for holding the glass between the rollers is too large in the method of controlling the withdrawal rate by holding sides of the glass, the glass may be broken, and it is hence impossible to apply a force larger than the predetermined force. When the weight of the glass shaped material increases, the glass shaped material may slip between the rollers, so that it is difficult to control the withdrawal rate. For avoiding the above situation, there can be employed a method in which the rate of withdrawing the glass from the through hole can be controlled by supporting the forward end of the glass withdrawn from the through hole outlet. FIG. 2 shows one embodiment of the above method. FIG. 2 is a schematic drawing of a variant of the production apparatus for use in the process for the production of a glass shaped material, provided by the present invention. Differing from the method in which the sides of the glass are held with a frictional force, this method is suitable for shaping a large-weight glass shaped material.

In any one of the above methods for controlling the withdrawal rate, the liquid level of the molten glass in the mold is monitored with a liquid level sensor 4, and when the liquid level is higher than a reference level on the basis of a signal from the above monitor, the withdrawal rate is increased or when the liquid level is lower than the reference level, the withdrawal rate is decreased, whereby the withdrawal rate can be controlled. For example, the above signal from the monitor is inputted to a rate controller 5, and the controller 5 compares the reference liquid level and the monitored liquid level and feeds a comparison result back to the withdrawal rate. In the method in which the withdrawal rate is controlled by holding the sides of the glass between the rollers (see FIG. 1), a control signal outputted from the controller 5 is inputted to a controller for a motor that rotates the rollers 3, whereby the rotation rate of the rollers 3 can be controlled. In the method in which the forward end of the glass withdrawn from the through hole outlet is supported to control the withdrawal rate (see FIG. 2), a control signal outputted by the controller 5 is inputted to an actuator of a mechanism (support mechanism 8) that is for supporting the forward end, whereby the moving rate of a member supporting the glass forward end can be controlled so that the member moves at a desired rate. The method for monitoring the liquid level of the molten glass in the mold is not specially limited, and for example, there can be employed a method using a thermometer, a laser sensor, or the like.

Meanwhile, as the angle formed by the central axis of the through hole and the vertical line increases, the frictional force between the through hole of the mold and the circumferential surface of the glass shaped material increases, and even if the glass shaped material has a large weight, it may be also possible to control the withdrawal rate according to the method in which the sides of the glass shaped material are held. When a glass shaped material having a large weight is produced from a glass whose viscosity is not extremely low when it is caused to flow out, the mold can be arranged in a manner in which the central axis of the through hole is inclined relative to the vertical line.

The method for separating a glass shaped material during the step of withdrawing will be explained below.

By the operation of bringing the temperature of its internal central portion and the temperature of its circumferential surface close to each other, the glass withdrawn from the through hole outlet has a reduced internal stress and is free from the risk of being explosively broken or being broken or damaged by a slight thermal shock or mechanical impact. Further, for cooling the glass to room temperature, it is required to withdraw the glass such that the glass has a large length. For this purpose, a large space may be required below the mold, or the weight of the glass shaped material may be too large, and it may be hence difficult to control the withdrawal rate accurately. In the present invention, therefore, the glass shaped material is preferably separated in a portion where the glass shaped material comes to have a temperature around its glass transition temperature.

FIGS. 3 to 5 show specific examples of the separation method. FIGS. 3 and 4 and FIG. 5 explain methods of separating a glass shaped material in the process for the production of a glass shaped material, provided by the present invention. It is preferred to employ a method of splitting the glass shaped material in which as shown in FIG. 3 a marking line (ruling line) in the direction perpendicular to the glass shaped material withdrawing direction is formed on part of the circumferential surface of the glass shaped material in a predetermined position by scribing, a fulcrum for locally supporting the circumferential surface is placed in a position which is opposed to the above-scribed position with regard to the central axis of the glass shaped material, and while the glass shaped material above the fulcrum is stopped from moving by means of the above fulcrum, a pressure is horizontally applied to that circumferential surface of the glass shaped material which is below the scribed position, to rupture the glass shaped material in the scribed position with the fulcrum being the center as shown in FIG. 4.

When a glass shaped material having a larger outer diameter is split, preferably, as shown in FIG. 5, a jacket made of a metal having a water passage formed therein is locally contacted to a scribed portion to cause a crack, which leads from a marking line into the glass, by a thermal impact (FIG. 5(b)), a circumferential surface opposed to the marking line with regard to the central axis of the glass shaped material is supported with a fulcrum (FIG. 5(c)), a force is applied to that portion of the glass shaped material which is below the marking line, and a torque is exerted such that the crack grows toward the portion supported with the fulcrum, to split the glass shaped material (FIG. 5(d)).

The size of the internal stress that is generated during the cooling step differs depending upon the form and size of the glass shaped material. For example, a very thin glass shaped material such as an optical fiber hardly has a temperature difference between an inner central portion and a circumferential surface. Further, a sheet-shaped glass having a very small thickness hardly has a temperature difference between an inside and a surface. On the other hand, a rod-shaped glass having a large outer diameter and a thick plate-shaped glass have a large temperature difference between an inside and a surface, and a large internal stress is liable to be generated during a cooling step. Such glass shaped materials include a plate-shaped glass having a thickness of 3 mm or more and a rod-shaped glass having an outer diameter of 3 mm or more. Therefore, the present invention is suitable for shaping a plate-shaped glass having a thickness of 3 mm or more, and more suitable for shaping a plate-shaped glass having a thickness of 5 mm or more. Further, the present invention is suitable for shaping a rod-shaped glass having an outer diameter of 3 mm or more, more suitable for shaping a rod-shaped glass having an outer diameter of 5 mm or more and still more suitable for shaping a rod-shaped glass having an outer diameter of 10 mm or more.

In the present specification, the "rod-shaped glass" refers to a glass shaped material having a cross-sectional form of a circle, an ellipse, a regular square, a rectangle in which the ratio of a major side length to a minor side length (major side length/minor side length) is 2 or less or a polygon. The "plate-shaped glass" refers to a glass plate in which the ratio of a width to a thickness (width/thickness) is over 2.

Further, the outer diameter of the rod-shaped glass refers to a length of the thinnest portion in a cross section perpendicular to the central axis of the rod-shaped glass. For example, in a columnar glass, the cross section perpendicular to the central axis of a column has the form of a circle, so that the outer diameter thereof is a diameter of the above circle. In a cylindroid-like glass, the cross section perpendicular to the central axis has the form of an ellipse, so that the outer diameter thereof is a minor diameter of the above ellipse. In a regular quadrangular prism-like glass, the cross section perpendicular to the central axis has the form of a regular square, so that the outer diameter thereof is a length of one side of the above regular square. In a quadrangular prism-like glass in which the cross section perpendicular to the central axis has the form of a rectangle, the outer diameter corresponds to a length of minor side of the above rectangle.

In the above-explained method, the molten glass flowing out of a flow pipe is continuously caused to flow into one mold that is provided below the outlet of the flow pipe, whereby a glass shaped material can be continuously shaped.

An embodiment using two molds will be explained below.

In the present invention, there may be also employed a constitution in which there are carried out the steps of providing a plurality of the above molds, arranging one of the molds in a position below the above pipe, causing a molten glass to flow into the mold arranged below the pipe to shape a glass shaped material, then, discontinuing the flowing of the molten glass into the mold, taking out the mold with the molten glass therein from the position below the above pipe and withdrawing the glass shaped material from the mold and there are repeated the steps of arranging another mold in the position below the above pipe, causing a molten glass to flow into the mold to shape a glass shaped material, discontinuing the flowing of the molten glass into the mold, taking out the mold with the molten glass therein from the above position and withdrawing the glass shaped material from the mold.

The above method is suitable for shaping a glass shaped material that is formed of a glass having a low viscosity when it flows out and that has a large weight. The above method requires a plurality of molds, a mechanism for consecutively transferring the molds to a position below a flow pipe and a mechanism for discontinuing the flowing of a molten glass into the mold, while it has an advantage that it is not required to carry out the flowing of the molten glass into the mold and the complete withdrawal of a glass shaped material from the same mold. Therefore, when the length of the glass shaped material comes to be a predetermined length, the flowing of the molten glass into the mold is discontinued, the mold with the glass shaped material in it can be carried from the position below the pipe and the glass shaped material can be withdrawn from the mold without cutting or splitting it apart. Therefore, the rate of withdrawing the glass shaped material can be controlled by supporting the forward end portion (lower end portion) of the glass shaped material, so that the rate of withdrawing a glass shaped material having a large weight can be highly accurately controlled over the with withdrawal rate control in the method in which the circumferential surface of a glass shaped material is held with a frictional force.

For discontinuing the flowing of the molten glass into the mold, for example, there can be employed a constitution in which a cutting blade suitable for cutting a molten glass flow having a low viscosity when it flows out is inserted between the outlet of the flow pipe and the inlet of the through hole to cut the flow of the molten glass and when the replacement of the mold with another mold is completed, the cutting blade is moved back to resume the flowing of a molten glass into the mold. In this method, preferably, the molten glass flowing out of the pipe is caused to continuously flow into the mold except that the flowing of the molten glass into the mold is discontinued as described above.

For replacing the molds, for example, there may be employed a constitution in which two molds are provided and the molds are alternately moved in and out of a position below the outlet of the flow pipe, or a constitution in which three or more molds are placed on a mechanism designed for synchronously transferring a plurality of molds and the turn table is index-rotated such that the molds consecutively remain in the position below the outlet of the flow pipe.

In any one of the method using one mold or the method using a plurality of molds, preferably, the pipe is vertically arranged and the mold is arranged such that the center of the liquid surface of the molten glass flow in the mold is positioned vertically below the center of the outlet of the flow pipe. In this manner, the molten glass can be caused to flow inside the mold from the inlet to the outlet in a uniform state, which is advantageous for obtaining an optically uniform glass shaped material.

The preferred embodiment of the process of the present invention is also suitable for shaping a glass having a kinetic viscosity coefficient of less than $7 \times 10^{-5}$ m$^2$/s, the coefficient of kinetic viscosity being obtained by dividing a viscosity of the glass at liquidus temperature by its density at room temperature. When it is intended to decrease or prevent striae of the glass shaped material, it is effective to produce a glass shaped material formed of a glass having the above kinetic viscosity coefficient of less than $7 \times 10^{-5}$ m$^2$/s by providing a mold having a through hole of which the central axis is straight (a through hole having an inlet and an outlet communicating with each other as straight as a straight line), arranging the mold such that the central axis of the through hole is vertical and causing a molten glass to continuously flow into the through hole through the inlet of the through hole. With regard to the form and dimensions of the through hole of the mold and the material for the mold, those conditions that are described already can be employed without any modification. Inside the through hole, preferably, the heat of the glass is absorbed through the circumferential surface of the glass by contacting the entire circumferential surface of the glass to the inner wall of the through hole. In this embodiment, it is also desirable to vertically arrange the flow pipe designed for causing a molten glass to flow out, as described already. In this manner, the flow of the glass in the pipe, the direction in which the glass moves inside the mold and the direction in which gravity works on the glass are rendered uniform. As a result, the surface and an inner portion of the glass are not mingled with each other, and the effect that the striae can be decreased or prevented can be improved. From the viewpoint of an improvement in the decreasing or preventing of striae, preferably, the positions of the pipe and the mold are adjusted such that the central axis of the pipe and the central axis of the through hole of the mold are in agreement, and the molten glass is caused to flow into the through hole.

A glass having a kinetic viscosity coefficient of less than $7 \times 10^{-5}$ m²/s is liable to give a glass shaped material having striae therein since it not only has a low liquidus viscosity but also has a high viscosity. According to the above method, however, striae are localized in a surface layer of a glass shaped material, and there can be obtained an optically uniform glass shaped material having an inner portion free of striae and having a large volume of such an inner portion. The thus-obtained glass shaped material can give a press-molding glass gob or an optical element by processing it, can give an optical element blank or an optical element by heating and press-molding the above press-molding glass gob, and can give an optical element by processing the above optical element blank, as will be explained later.

When it is attempted to shape a glass having a kinetic viscosity coefficient of less than $3 \times 10^{-5}$ m²/s according to any conventional method, it is difficult to produce a glass shaped material having a high quality level for use as an optical glass and a glass in other optical use. Similarly, it is very difficult to obtain a glass shaped material having the above high quality from a glass having a kinetic viscosity coefficient of $4 \times 10^{-5}$ m²/s or less, and it is difficult to obtain a glass shaped material having the above high quality from a glass having a kinetic viscosity coefficient of $5 \times 10^{-5}$ m²/s or less. Similarly, a glass shaped material from a glass having a kinetic viscosity coefficient of $6.5 \times 10^{-5}$ m²/s or less has a defective portion increased in size by striae.

In contrast, the process of the present invention, in particular the embodiment intended for decreasing or preventing striae is suitable for shaping a glass having a kinetic viscosity coefficient of $6.5 \times 10^{-5}$ m²/s or less, more suitable for shaping a glass having a kinetic viscosity coefficient of $5 \times 10^{-5}$ m²/s or less, still more suitable for shaping a glass having a kinetic viscosity coefficient of $4 \times 10^{-5}$ m²/s or less and particularly suitable for shaping a glass having a kinetic viscosity coefficient of $3 \times 10^{-5}$ m²/s or less. A glass shaped material having a large volume can be thus obtained even from a glass having a small kinetic viscosity coefficient.

According to the process for the production of a glass shaped material, provided by the present invention, an optically uniform glass shaped material formed of the above optical glass can be highly productively produced as explained already without breaking or damaging it.

[Process for the Production of Press-Molding Glass Gob]

The process for the production of a press-molding glass gob, provided by the present invention, will be explained below.

The process for the production of a press-molding glass gob, provided by the present invention, comprises processing a glass shaped material produced by the above process for the production of a glass shaped material, provided by the present invention, to produce a press-molding glass gob to be press-molded by softening under heat.

The operation of bringing the temperature of inner central portion of a glass and the temperature of circumferential surface of the glass close to each other in the process for the production of a glass shaped material in the present invention is carried out for preventing the destruction of a glass shaped material caused by a large internal stress. However, it is not any precise annealing for precisely bringing optical properties of the glass including a refractive index into agreement with predetermined values, nor is it any annealing for gradually cooling the glass to room temperature. For the above annealing of a glass shaped material withdrawn from a mold as it is, it is required to provide a large-length annealing furnace below the mold, which is not practical. Further, when it is attempted to split a glass shaped material as described above after the glass shaped material is cooled to room temperature, the splitting is not easy since the glass has an increased Young's modulus.

Therefore, the above operation of bringing the temperature of inner central portion of a glass and the temperature of circumferential surface of the glass close to each other is completed before the glass temperature (temperature on the circumferential surface of the glass) comes to be a temperature lower than the glass transition temperature by 150° C., preferably by 100° C., more preferably by 50° C., still more preferably, the operation is completed when the glass temperature is around the glass transition temperature, and the glass shaped material is split in a state where the Young's modulus is not increased. As a splitting method, there can be employed a method in which a marking line is formed on the circumferential surface of the glass shaped material by scribing and a torque is exerted on the glass shaped material such that a crack grows from the marking line into the glass shaped material. However, when the glass shaped material has an outer diameter of 40 mm or more, it is difficult to split the glass if the torque is all that is exerted. In such a case, preferably, it can be utilized that the glass shaped material has a high temperature, that is, a thermal impact is given by locally cooling a scribed portion, to grow a crack from the scribed portion into the glass, and then the torque is exerted to split the glass shaped material. In this manner, a glass shaped material having an outer diameter of 40 mm or more can be relatively easily split. The torque can be exerted on the glass shaped material by supporting that circumferential portion of the glass shaped material which is opposed to the scribed portion with a fulcrum and applying a force such that the scribed portion spreads ahead on the circumferential surface of the glass shaped material.

The glass shaped material can be split in a state where it has an internal strain reduced by the operation of bringing the temperature of inner central portion of a glass and the temperature of circumferential surface of the glass close to each other, so that the splitting can be excellent carried out by exerting a torque or using a torque and a thermal impact in combination.

A top portion glass separated from the glass shaped material that is thus withdrawn from the mold or the shaping furnace is transferred into a gradually cooling furnace and gradually cooled to a temperature around room temperature.

In the above method using a plurality of molds, the glass shaped material obtained after the bringing the temperature of its internal central portion and the temperature of its circumferential surface close to each other is as well transferred into a gradually cooling furnace and gradually cooled to a temperature around room temperature.

The glass shaped material can be transferred into the gradually cooling furnace by means of a robotic mechanism. In this case, when the glass is rapidly cooled with a holding portion, the glass may be broken due to a thermal shock. It is therefore desirable to employ a constitution in which the portion for holding the glass shaped material is composed of a material having a small specific heat, a constitution employing a mechanism for heating the holding portion with a heater or a constitution in which the portion for holding the glass shaped material is composed of a material having a small specific heat and the holding portion is heated with a heater.

In the gradually cooling furnace, the glass shaped material is cooled to a temperature around room temperature to remove a strain. As a gradually cooling furnace, there may be used a continuous gradually cooling furnace called Lehr or a gradually cooling furnace called "standing cool-off type".

Them, the glass shaped material having a strain removed is split in a desired size. As a splitting method, there may be employed a method using a wire saw, a grinder, or the like or a method in which a marking line is formed in a portion to be split by scribing and a pressure is applied to the glass shaped material such that a crack extends from the marking line to split the glass.

According to the present invention, there can be obtained a glass shaped material having the central axis and having a cross section perpendicular to the central axis which cross section is constant along the central axis even if the glass shaped material is a rod-shaped glass or a plate-shaped glass, so that it is desirable to process the glass shaped material by cutting or splitting it into pieces in the direction perpendicular to the central axis. When cutting or splitting positions are at regular intervals, there can be easily obtained glass blocks having equal volumes. When the cutting or splitting positions are at changing intervals, the volume of the glass shaped material can be divided among glass blocks depending upon the changed intervals. When a rod-shaped glass is processed in a manner in which the central axis is cut in the direction perpendicular to the central axis, there can be obtained glass pieces called cut pieces. In the case of a plate-shaped glass, glass pieces called cut pieces can be obtained by further cutting or splitting the above-obtained glass block.

The above various cut pieces may be used as press-molding glass gobs. However, the cut pieces are preferably cut or polished, or they are cut and polished, to give press-molding glass gobs. Since the cut piece has acute edges, the edges can be rounded by the above machining. For uniformly heating a glass gob with infrared ray during its press-molding, it is desirable to roughen the surface of the glass gob beforehand by the above processing. After the surface-roughening, a powder mold release agent for use in press-molding can be also uniformly applied to the entire surface of the glass gob. Barrel-polishing is suitable for the above surface-roughening.

When the press-molding glass gob is used in precision press-molding, desirably, at least that surface of the glass gob to which the molding surface of a precision-press mold is to be transferred is, or preferably all the surfaces thereof are finished, by polishing such that the surface or the surfaces are smooth.

In the above manner, a press-molding glass gob can be produced from a glass shaped material.

A lateral pressure cutting method that is particularly preferred as a method for splitting a gradually cooled glass shaped material will be explained below. In this method, a rod-shaped glass is used as a glass shaped material, part of the circumferential surface of the rod-shaped glass is scribed and a pressure is applied to the scribed portion and circumferential surface portions on both sides separated in the scribed portion in a state where nothing prevents rod-shaped glass portions on both sides separated in the scribed portion from coming apart from each other, to split the rod-shaped glass in the scribed portion.

A specific example of the above method will be explained with reference to FIGS. 6 and 7, which are schematic drawings for explaining the lateral pressure cutting method. First, in FIG. 6, numeral 11 indicates a rod-shaped glass (glass shaped material) having a portion scribed in a predetermined position on a circumferential surface, and numeral 12 indicates a pressure vessel. The pressure vessel 12 has opening portions through which the rod-shaped glass 11 is to be inserted and a liquid introduction port 13. The pressure vessel 12 has a hermetically closed structure except for the above opening portion and liquid introduction port. The rod-shaped glass is inserted through the above opening portions to close the opening portions, and the rod-shaped glass is arranged such that the scribed portion comes to be positioned around the center of the pressure vessel 12. In the above opening portions, gaps between the pressure vessel and the rod-shaped glass are sealed. When a liquid is introduced into the pressure vessel and when the pressure of the liquid is increased, the liquid hence does not leak out of the pressure vessel. The above sealing is not to stop the rod-shaped glass from moving in the longitudinal direction. The sealing can be carried out, for example, with a chuck made of a rubber.

Then, a liquid is introduced through the liquid introduction port 13 to fill the pressure vessel 12 with the liquid, and the pressure of the liquid in the pressure vessel is increased. A pressure is uniformly exerted on a non-scribed portion on the circumferential surface of the rod-shaped glass in the pressure vessel. However, the pressure works on the scribed portion so as to press the scribed portion open, and it causes a crack to grow in the direction perpendicular to the central axis of the rod-shaped glass, to split the rod-shaped glass into the two in the scribed portion.

When the rod-shaped glass is a round-rod-shaped glass having a cross section in the form of a circle, an ellipse, an oval, an oval-like shape having two parallel sides and two semi-circular sides or the like when it is taken at right angles with the central axis, the rod-shaped glass can be relatively easily split by the lateral pressure cutting method. However, it is difficult to split a square or rectangular rod-shaped glass by the lateral pressure cutting method, so that the lateral pressure cutting method is desirably applied to the splitting of a round-rod-shaped glass.

For splitting the rod-shaped glass in the direction perpendicular to the central axis by the lateral pressure cutting method, it is effective to fully reduce a strain in the rod-shaped glass beforehand by gradual cooling. Split surfaces of the thus-split rod-shaped glass are mirror surfaces, and unlike a cutting procedure, no cutting margin is required and no cutting dust is formed, so that the glass can be effectively used. In not only the lateral pressure splitting method but also any splitting method, a glass is split by breaking unlike a cutting method in which a glass is cut by grinding, so that a glass can be effectively used and that the amount of waste can be decreased.

The above-obtained glass blocks were processed to obtain cut pieces, and the cut pieces are processed, as described above, to give press-molding glass gobs.

The liquid for use in the lateral pressure cutting method is preferably a liquid that does not deteriorate any one of the glass surface, the pressure vessel, a sealing material and a compressor device connected to the liquid introduction port of the vessel for increasing the pressure of the liquid, that has a small surface tension and can be completely filled in the scribed portion and that is easy to handle. As the above liquid, water is preferred.

The pressure of the liquid for the lateral pressure cutting can be adjusted as required depending upon the properties, form, dimensions, etc., of a glass, while approximately 20 MPa can be a target pressure. The pressure vessel can be a vessel that has sufficient pressure resistance (for example, resistance to 50 MPa) against a maximum pressure.

The weight of the press-molding glass gob is determined so as to be equivalent to the weight of an intended press-molded article, and the form and dimensions of the press-molding glass gob can be determined as required by taking account of the form the above press-molded article and the form of a press mold.

[Process for the Production of Optical Element]

The process for the production of an optical element, provided by the present invention, will be explained below. The process for the production of an optical element, provided by the present invention, includes two embodiments.

The first embodiment (to be referred to as "process I for the production of an optical element" hereinafter) is a process for the production of an optical element, in which a press-molding glass gob prepared by the above production process is heated and press-molded in a press mold.

The process I for the production of an optical element can be further classified into two methods. The first method is a method in which a press-molding glass gob is softened under heat, introduced into a press mold and press-molded and a press-molded product is gradually cooled and then ground and polished to complete an optical element. In this method, a glass gob is press-molded such that the press-molded product has a form including a grinding margin and a polishing margin in addition to the form of an optical element. This method uses a glass gob of which the entire surface is roughened by barrel polishing or the like, and a powder mold release agent such as boron nitride or the like is applied to the entire surface of the glass gob. Then, the glass gob is introduced into a heating furnace and softened under heat and is introduced into a press mold. Then, the glass gob is press-molded with an upper mold member and a lower mold member, the mold is opened to obtain a press-molded product and the press-molded product is placed in a gradually cooling furnace to reduce a strain and bring the refractive index of the glass precisely into an intended value. After the molded product is cooled to room temperature, the molded product is ground and polished by a grinding and polishing method that is known for an optical element formed of a glass, to complete an optical element. In this manner, various optical elements such as a spherical lens, a prism, etc., are produced. An optical multi-layer film such as an anti-reflection film may be formed on the optical element surface as required.

The second method of the process I for the production of an optical element is a method in which a press-molding glass gob having a finished smooth surface is heated and precision press-molded to produce an optical element. The precision press-molding is also called mold optics shaping and is a method in which, with a press mold having mold members with precisely worked molding surface(s) and having the above mold members highly precisely set, the entire form of an optical element is shaped (molded) and the above molding surface(s) is/are precisely transferred to a glass to form optical-function surface(s). In this method, an optical element with a plurality of optical-function surfaces having highly precise positional accuracy can be also produced. For example, there can be produced a lens in which the gradient (tilt) of central axis of an optical-function surface and the deviation (decentering) of the above central axis on each lens surface are controlled (suppressed). In the second method, the optical-function surface, that is, that surface of an optical element which refracts, diffracts, reflects or transmits light can be formed without relying on machining processes such as grinding, polishing, etc., so that optical elements such as an aspherical lens, etc., which require a labor and a cost if produced by a machining process, can be highly productively produced. The precision press-molding can be carried out according to a known method. For example, a film having a function to improve mold releasability to improve slidability between a glass and the molding surface, such as a carbon film, is formed on the entire surface of a press-molding glass gob, and the glass gob is heated in a non-oxidizing atmosphere and precision press-molded in the same atmosphere. Then, the press mold is opened and the press-molded article is taken out and gradually cooled to give an optical element. The thus-obtained optical element may be machined with regard to a circumferential portion around the optical-function surface. For example, it may be processed for centering and edging. In the above manner, optical elements such as an aspherical lens, a spherical lens, a lens array, a micro lens, a diffraction grating, a prism, etc., can be highly productively produced. An optical multi-layer film such as an anti-reflection film may be formed on the optical element surface as required.

In the second embodiment of the process for the production of an optical element (to be referred as "process II for the production of an optical element" hereinafter), provided by the present invention, a glass shaped material prepared by the already described production method is machined to produce an optical element.

First, a glass shaped material is precisely annealed to bring the refractive index of the glass precisely into an intended value and reduce a strain, and the glass shaped material is cut or split to prepare a cut piece, in the same manner as in the step of the above process for the production of a press-molding glass gob. As a form of the glass shaped material, for example, there are a rod-shaped glass, a plate-shaped glass and the like. When the glass is split in the direction perpendicular to the central axis of the round-rod-shaped glass, preferably, the lateral pressure cutting method is applied as is applied in the process for the production of a press-molding glass gob.

Then, the cut piece is grounded to obtain an optical element blank having a form including a polishing margin in addition to the form of an optical element, and the blank is polished to complete an optical element.

When a rod-shaped glass is used in the process II for the production of an optical element, preferably, the rod-shaped glass is shaped such that the outer diameter of the rod-shaped glass is equivalent to the outer diameter of an optical element or that the rod-shaped glass has a grinding margin and a polishing margin in addition to the outer diameter of an optical element. In addition, when a rod-shaped glass is used in the process I for the production of an optical element, it is also preferred to shape the rod-shaped glass such that the outer diameter of the rod-shaped glass is equivalent to the outer diameter of a press-molding glass gob or that the rod-shaped glass has a grinding margin and a polishing margin in addition to the outer diameter of a press-molding glass gob.

In the above manner, various optical elements such as a lens, a prism, etc., can be highly productively produced without breaking a glass. An optical multi-layer film such as an anti-reflection film may be formed on the optical element surface.

EXAMPLES

The present invention will be explained in detail with reference to Examples hereinafter.

Example 1

In this Example, according to the following method, there was prepared a round-rod-shaped glass shaped material formed of an optical glass (to be referred to as "optical glass 1" hereinafter) having a refractive index (nd) of 2.08313, an Abbe's number (vd) of 22.23, a liquidus temperature of 1,270° C., a viscosity of 0.824 dpa·s at the liquidus temperature, a glass transition temperature of 701° C., a density of 4.780 at room temperature and a kinetic viscosity of 1.724× $10^{-5}$ m$^2$/s and containing 6.24% of $B_2O_3$, 3.59% of $SiO_2$, 32.44% of $La_2O_3$, 26.73% of $TiO_2$, 13.74% of BaO, 11.12% of $Nb_2O_5$ and 6.14% of $ZrO_2$.

Glass raw materials were weighed for obtaining the optical glass 1, fully mixed, then introduced into a melting furnace and heated to melt them. Then, a fully refined and homogenized molten glass having a viscosity of 0.6 dpa·s was caused to continuously flow out of a vertically arranged pipe flow outlet at a constant flow rate (15 ml/minute) and caused to continuously flow without any interruption into the center of inlet of a through hole formed in a mold made of a carbon arranged in a position as shown in FIG. 1. The molten glass flowing into the through hole had a temperature of 1.320° C. The through hole of the mold had an inner diameter φ of 12 mm, and it was arranged that the central axis of the through hole was in agreement with the vertical direction and that the central axis of the pipe and the above central axis of the through hole were in agreement. The through hole of the mold had a length of 100 mm. For good shaping, a band heater that is not shown was wrapped around the mold to heat the mold, and the temperature of inner wall of the through hole was controlled to keep it at 520 to 600° C. The round-rod-shaped glass withdrawn from the outlet of the through hole was held between two rollers to control the rate of withdrawing the round-rod-shaped glass. The liquid level of molten glass in the through hole of the mold was monitored with a laser sensor, and monitor signals outputted by the above sensor were inputted to a roller controller to control the electric input into a motor that rotated the rollers such that the above liquid level was constant. In this Example, the rate of withdrawing the round-rod-shaped glass was set at 2.2 mm/minute, and the above liquid level was maintained at a constant level by applying feedback to the rotation speed of the rollers depending upon a change in the above liquid level.

A round-rod-shaped glass having a size of φ 12 mm was continuously withdrawn from the outlet of the through hole in the above manner. A shaping furnace was placed immediately below the mold, and the round rod-shaped glass withdrawn from the mold was immediately moved into the shaping furnace. A heater that is not shown was provided in the shaping furnace, and the temperature of an atmosphere in the furnace was maintained at 780° C. The shaping furnace had the above rollers therein. The shaping furnace had a length of 360 mm along the moving direction of the round-rod-shaped glass, and the round-rod-shaped glass moved inside the shaping furnace while taking a time. During the movement, the temperatures of inner central portion and surface of the round rod-shaped glass came close to each other, so that no internal stress that would explosively break the round-rod-shaped glass was generated and that the round-rod-shaped glass could be shaped without breaking the glass.

A marking line in the direction perpendicular to the central axis of the round-rod-shaped glass was formed on part of circumferential surface of the round-rod-shaped glass from the shaping furnace by scribing. And, for causing a crack to extend from the marking line to the internal center by locally cooling the portion where the marking was formed, a jacket made of a metal having an internal water passage through which water was flowing was contacted to the marking line. In this case, the jacket made of a metal was allowed to move to follow the movement of the round-rod-shaped glass such that the jacket maintained a state where it was in contact with the marking line. When the crack grown, a fulcrum was provided to support that portion of the circumferential surface of the round rod-shaped glass which was opposed to the marking-line-formed portion with regard to the central axis of the round rod-shaped glass, and when a pressure was applied to that portion of the circumferential surface of the round-rod-shaped glass which was below the marking line, a round-rod-shaped glass portion in a position lower than the marking line height was separated from a round-rod-shaped glass in a position higher than the marking line height. In addition, since the round rod-shaped glass of this Example had a relatively small outer diameter of as small as 12 mm, round-rod-shaped glass portions could be separated without exerting a thermal impact by contacting the jacket made of a metal.

In the separation, a circumferential surface of the round-rod-shaped glass to be separated was held with a robotic arm, and after the separation, the separated round rod-shaped glass was transferred to an inlet of a continuous gradually cooling furnace located near the mold and the shaping furnace in a state where it was held with the above arm. A heater and a glass-conveying belt conveyor were placed in the continuous gradually cooling furnace, and while the belt with the round-rod-shaped glass placed thereon was operated in the furnace having a controlled temperature distribution, the round-rod-shaped glass was gradually cooled to remove a strain.

The round-rod-shaped glass that was taken out of the continuous gradually cooling furnace was cut, and the cut surface was polished and observed to show that striae were found only in a very shallow layer within 0.5 mm from the surface and that no striae were found in any portion deeper than the above layer. That is, most part of the round-rod-shaped glass was optically uniform.

Similarly, round-rod-shaped glasses formed of optical glasses 2 to 9 shown in Table 1 were shaped without breaking any glass. Each of these round-rod-shaped glasses was gradually cooled in the continuous gradually cooling furnace, taken out of the furnace and cut, and the cut surface of each glass was polished and observed to show that striae were found only in a very shallow layer within 0.5 mm from the surface and that no striae were found in any portion deeper than the above layer. That is, most part of each of the round-rod-shaped glasses was optically uniform.

Table 1 shows compositions of the above glasses, and Table 2 shows properties thereof.

The properties were measured according to the following methods.

(1) Refractive index (nd) and Abbe's number (vd)

An optical glass obtained by cooling at a temperature decrease rate of 30° C./hour was measured.

(2) Density

Measured according to an Archimedean method.

(3) Transition temperature

Measured with an apparatus for thermomechanical analysis at a temperature elevation rate of 4° C./minute.

(4) Kinetic viscosity

An optical glass was measured for a liquidus temperature and a viscosity at the liquidus temperature according to the following methods, and the obtained viscosity was divided by a density at room temperature to determine a kinetic viscosity.

(a) Liquidus temperature

A plurality of crucibles made of platinum were prepared, 50 cm$^3$ of a glass was placed in each of the crucibles and covered, the crucibles were placed in a furnace having temperatures set at intervals of 10° C. and were maintained under conditions of the thus-set different temperatures for 2 hours, and a lowest temperature at which no crystal was visually observed was taken as a liquidus temperature.

(b) Viscosity at liquidus temperature (liquidus viscosity)

Measured with a co-axial cylindrical viscometer according to the method provided in JIS Z8803.

(5) λ70 and λ5

Of spectral light transmittances measured according to the method described in the present specification, a wavelength at which the transmittance was 70% was shown as λ70, and a wavelength at which the transmittance was 5% was shown as λ5.

Example 2

Press-molding glass gobs were produced from round-rod-shaped glasses obtained and gradually cooled in Example 1 in the following manner. First, a marking line was formed, by scribing, on the circumferential surface of the round-rod-shaped glass in a portion in which the round-rod-shaped glass was to be split. The round-rod-shaped glass was inserted into a pressure vessel such that the marking-line-formed portion was positioned in the center of the vessel. The round-rod-shaped glass was chucked in opening portions of the vessel by rubber sealing in a manner in which the movement of the round rod-shaped glass in the central axis direction was not limited, and water was poured into the vessel until the water was filled in the vessel so that no bubbles were included.

In the above state, the pressure of the water in the vessel was increased up to approximately 20 MPa to split the glass in the direction perpendicular to the central axis of the round rod-shaped glass. The round rod-shaped glass was split at predetermined intervals in the above manner to obtain cut pieces.

Then, the cut pieces were barrel-polished such that each cut piece had a weight approximately equivalent to the weight of an intended press-molded product, and sharp edges were round. The cut pieces were surface-roughened to give press-molding glass gobs.

Example 3

The cut pieces prepared in Example 2 were ground and polished to give press-molding glass gobs having a smooth surface each.

TABLE 1

| Optical glass species | Glass composition (mass %) | | | | | | | | | | | | | |
|---|---|---|---|---|---|---|---|---|---|---|---|---|---|---|
| | SiO$_2$ | B$_2$O$_3$ | (B$_2$O$_3$ + SiO$_2$) [A] | La$_2$O$_3$ | TiO$_2$ | Nb$_2$O$_5$ | WO$_3$ | (La$_2$O$_3$ + TiO$_2$ + Nb$_2$O$_5$ + WO$_3$) [B] | ZrO$_2$ | BaO | ZnO | (MgO + CaO + SrO + BaO) [RO] | Sb$_2$O$_3$ | [A]/[B] Mass ratio | [RO]/[B] Mass ratio |
| 1 | 3.59 | 6.24 | (9.83) | 32.44 | 26.73 | 11.12 | 0.00 | (70.29) | 6.14 | 13.74 | 0.00 | (13.74) | 0.00 | 0.1398 | 0.1955 |
| 2 | 3.54 | 5.13 | (8.67) | 32.01 | 28.73 | 10.97 | 0.00 | (71.71) | 6.05 | 13.56 | 0.00 | (13.56) | 0.01 | 0.1209 | 0.1891 |
| 3 | 3.53 | 5.11 | (8.64) | 31.90 | 29.41 | 7.03 | 2.27 | (70.61) | 7.24 | 13.51 | 0.00 | (13.51) | 0.01 | 0.1224 | 0.1912 |
| 4 | 6.16 | 8.30 | (14.46) | 33.42 | 20.29 | 8.32 | 0.00 | (62.03) | 6.55 | 15.66 | 1.31 | (15.66) | 0.00 | 0.2331 | 0.2525 |
| 5 | 3.43 | 2.65 | (6.08) | 31.04 | 33.19 | 10.64 | 0.00 | (74.87) | 5.87 | 13.15 | 0.00 | (13.15) | 0.01 | 0.0812 | 0.1756 |
| 6 | 4.85 | 7.25 | (12.10) | 32.92 | 23.57 | 9.74 | 0.00 | (66.23) | 6.34 | 14.68 | 0.64 | (14.68) | 0.01 | 0.1827 | 0.2217 |
| 7 | 3.50 | 4.39 | (7.89) | 31.62 | 30.71 | 6.97 | 2.25 | (71.55) | 7.18 | 13.39 | 0.00 | (13.39) | 0.00 | 0.1103 | 0.1871 |
| 8 | 3.47 | 3.68 | (7.15) | 31.35 | 31.98 | 6.90 | 2.23 | (72.46) | 7.11 | 13.28 | 0.00 | (13.28) | 0.00 | 0.0987 | 0.1833 |
| 9 | 3.51 | 4.41 | (7.92) | 31.73 | 30.04 | 10.87 | 0.00 | (72.64) | 6.00 | 13.44 | 0.00 | (13.44) | 0.00 | 0.1090 | 0.1850 |

TABLE 2

| Optical glass species | Refractive index (nd) | Abbe's number (vd) | Density (g/cm$^3$) | Liquidus temperature (° C.) | Liquidus viscosity (dPa · s) | λ 70 (nm) | λ 5 (nm) | Kinetic viscosity (× 10$^{-5}$ m$^2$/s) | Glass transition temperature (° C.) |
|---|---|---|---|---|---|---|---|---|---|
| 1 | 2.08313 | 22.23 | 4.780 | 1270 | 0.824 | 465 | 374 | 1.724 | 701 |
| 2 | 2.10449 | 22.51 | 4.826 | 1270 | 0.824 | 529 | 390 | 1.707 | 704 |
| 3 | 2.10226 | 21.58 | 4.856 | 1270 | 1.01 | 527 | 389 | 2.080 | 716 |
| 4 | 2.00069 | 25.46 | 4.730 | 1150 | 3.58 | 445 | 370 | 7.569 | 690 |
| 5 | 2.15813 | 22.18 | 4.867 | 1300 | 0.500 | 659 | 391 | 1.027 | 718 |
| 6 | 2.04191 | 23.85 | 4.755 | 1210 | 2.20 | 455 | 372 | 4.627 | 695 |
| 7 | 2.11623 | 21.21 | — | — | — | 563 | 390 | — | — |
| 8 | 2.12969 | 20.84 | — | — | — | 658 | 393 | — | — |
| 9 | 2.11945 | 22.10 | 4.823 | — | — | 608 | 390 | — | — |

Example 4

A powder mold release agent containing boron nitride was uniformly applied to the entire surface of each of the press-molding glass gobs prepared in Example 2, and each of them was independently introduced into a heating furnace and softened under heat in atmosphere in the furnace while each gob was moved.

These softened gobs were pressed-molded in the following manner to give optical element blanks. That is, a softened glass gob was introduced into a press mold having an upper mold member, a lower mold member and a sleeve and press-molded in an atmosphere, the mold was opened, and a press-molded product was taken out, placed in a gradually cooling furnace, subjected to precision annealing and cooled to room temperature to give an optical element blank.

The thus-obtained blanks were ground and polished to give spherical lenses formed of the optical glasses 1 to 9.

Neither devitrification nor striae were found inside the lenses, and optically uniform optical elements were obtained.

Example 5

A carbon film was formed on the entire surface of each of the press-molding glass gobs prepared in Example 3, and each of the gobs was individually heated in a gas-mixture atmosphere containing nitrogen and hydrogen and precision press-molded with a press mold made by forming a carbon film as a mold release film on the molding surface of a mold material made of SiC. Then, the precision press-molded products were gradually cooled to give aspherical lenses formed of the optical glasses 1 to 9.

Neither devitrification nor striae were found inside the lenses, and optical uniform optical elements were obtained.

Example 6

Each of the precision-annealed round-rod-shaped glasses obtained in Example 1 was split in the direction perpendicular to the central axis by the lateral pressure cutting method to obtain cut pieces. These cut pieces were ground and polished to give spherical lenses formed of the optical glasses 1 to 9.

Neither devitrification nor striae were found inside the lenses, and optical uniform optical elements were obtained.

INDUSTRIAL UTILITY

The optical glass of the present invention has a remarkably high refractive index (nd) of 2.000 or more without being based on PbO, and it is also excellent in stability. This optical glass can give press-molding glass gobs, optical element blanks and optical elements.

The invention claimed is:

1. An optical glass comprising, as essential components, at least one oxide selected from $La_2O_3$, $Gd_2O_3$, $Y_2O_3$, $Yb_2O_3$, $TiO_2$, $Nb_2O_5$ and $WO_3$, at least one oxide selected from MgO, CaO, SrO and BaO, and $B_2O_3$ and optionally containing $SiO_2$, wherein on the basis of mass,
   (a) the total content of $B_2O_3$ and $SiO_2$ is from 1 to 25%,
   (b) the ratio of the total content of $B_2O_3$ and $SiO_2$ to the total content of $La_2O_3$, $Gd_2O_3$, $Y_2O_3$, $Yb_2O_3$, $TiO_2$, $Nb_2O_5$ and $WO_3$, $(B_2O_3+SiO_2)/(La_2O_3+Gd_2O_3+Y_2O_3+Yb_2O_3+TiO_2+Nb_2O_5+WO_3)$, is from 0.05 to 0.3, and
   (c) the ratio of the total content of MgO, CaO, SrO and BaO to the total content of $La_2O_3$, $Gd_2O_3$, $Y_2O_3$, $Yb_2O_3$, $TiO_2$, $Nb_2O_5$ and $WO_3$, $(MgO+CaO+SrO+BaO)/(La_2O_3+Gd_2O_3+Y_2O_3+Yb_2O_3+TiO_2+Nb_2O_5+WO_3)$, is from 0.1 to 0.4,
   the optical glass having a refractive index (nd) of 2.000 or more, an Abbe's number (vd) of 27 or less and is substantially free of PbO.

2. The optical glass of claim 1 which contains, by mass %, 25 to 45% of total of $La_2O_3$, $Gd_2O_3$, $Y_2O_3$ and $Yb_2O_3$, 18 to 38% of $TiO_2$, 5 to 15% of $Nb_2O_5$, 0 to 7% of $WO_3$, 0 to 10% of total of MgO, CaO and SrO and 7 to 17% of BaO.

3. The optical glass of claim 1 which contains 2 to 10 mass % of $ZrO_2$.

4. The optical glass of claim 1 which contains 1 to 15 mass % of $B_2O_3$ and 0 to 10 mass % of $SiO_2$.

5. The optical glass of claim 4 wherein the ratio of content of $SiO_2$ to the content of $B_2O_3$, $SiO_2/B_2O_3$, on the basis of mass is from 0.3 to 2.

6. The optical glass of claim 1 which contains 25 to 40 mass % of $La_2O_3$.

7. The optical glass of claim 1 wherein the ratio of content of $Nb_2O_5$ to the content of $TiO_2$, $Nb_2O_5/TiO_2$, on the basis of mass is 0.1 or more but less than 0.5.

8. A press-molding glass gob formed of the optical glass of claim 1.

9. An optical element blank that is an optical element blank formed of an optical glass for producing an optical element by grinding and polishing, the optical glass being the optical glass of claim 1.

10. An optical element formed of the glass of claim 1.

11. A process for the production of a glass shaped material formed of the optical glass of claim 1, which comprises providing a mold having a through hole that has an inlet and an outlet, causing a molten glass flow to flow from the inlet into said through hole to fill said through hole with the molten glass flow and continuously withdrawing a glass material shaped in said through hole from the outlet of the through hole.

12. A process for the production of a press-molding glass gob, which comprises processing a glass shaped material produced by the production process of claim 11.

13. A process for the production of an optical element, which comprises processing a glass shaped material produced by the process of claim 11.

* * * * *